(12) United States Patent
Magato et al.

(10) Patent No.: US 8,886,356 B2
(45) Date of Patent: Nov. 11, 2014

(54) SELECTABLE RELEASE MODE MERGE SUBSYSTEM

(71) Applicant: Intelligrated Headquarters LLC, Mason, OH (US)

(72) Inventors: William A. Magato, Milford, OH (US); Douglas A. Charlton, Miamisburg, OH (US); Brian J. Resnick, West Chester, OH (US)

(73) Assignee: Intelligrated Headquarters LLC, Mason, OH (US)

( * ) Notice: Subject to any disclaimer, the term of this patent is extended or adjusted under 35 U.S.C. 154(b) by 0 days.

(21) Appl. No.: 14/081,034

(22) Filed: Nov. 15, 2013

(65) Prior Publication Data

US 2014/0142747 A1 May 22, 2014

Related U.S. Application Data

(60) Provisional application No. 61/727,666, filed on Nov. 16, 2012.

(51) Int. Cl.
| | |
|---|---|
| *G06F 7/00* | (2006.01) |
| *B65G 43/00* | (2006.01) |
| *B65G 43/08* | (2006.01) |
| *B65G 47/68* | (2006.01) |
| *G05B 19/418* | (2006.01) |

(52) U.S. Cl.
CPC ............. *B65G 43/00* (2013.01); *B65G 43/08* (2013.01); *B65G 47/681* (2013.01); *G05B 19/4189* (2013.01)
USPC ........... 700/230; 700/228; 700/229; 700/213; 700/219

(58) Field of Classification Search
CPC ...... B65G 43/00; B65G 43/08; B65G 47/681; B65G 47/22; B65G 47/31; B65G 47/52
See application file for complete search history.

(56) References Cited

U.S. PATENT DOCUMENTS

| | | | | |
|---|---|---|---|---|
| 4,044,897 A | * | 8/1977 | Maxted | 198/349 |
| 5,267,638 A | | 12/1993 | Doane | |
| 6,129,199 A | | 10/2000 | Gretener et al. | |
| 8,061,506 B2 | * | 11/2011 | Schafer | 198/444 |

FOREIGN PATENT DOCUMENTS

| | | |
|---|---|---|
| JP | 2007-137569 A | 6/2007 |
| JP | 2010-089880 A | 4/2010 |
| WO | 99/41169 A1 | 8/1999 |

OTHER PUBLICATIONS

International Search Report and Written Opinion for International Application No. PCT/US2013/070253, mailed Feb. 17, 2014.

* cited by examiner

*Primary Examiner* — Yolanda Cumbess
(74) *Attorney, Agent, or Firm* — The Marbury Law Group, PLLC

(57) ABSTRACT

Methods, devices, non-transitory storage media, and systems that utilize operations including configuring each feed conveyor in the plurality of feed conveyors to operate in a slug-building merge mode, monitoring to identify a first predefined condition, configuring each feed conveyor in the plurality of feed conveyors to operate in a zippering merge mode in response to identifying the first predefined condition, monitoring to identify a second predefined condition, and configuring a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition.

32 Claims, 12 Drawing Sheets

SELECTABLE RELEASE MODE MERGE SUBSYSTEM

RELATED APPLICATIONS

The present application claims the benefit of priority to U.S. Provisional Application No. 61/727,666, entitled "Selectable Release Mode Merge Subsystem" filed Nov. 16, 2012, the entire contents of which are hereby incorporated by reference.

BACKGROUND

The present disclosure relates generally to material handling systems, and is more particularly directed to merge subsystems which merge articles carried by a plurality of conveyor lines onto a conveyor in single file.

In material handling systems, it is well known to use a merge subsystem to merge a plurality of article feed conveyors into a single line to meet the requirements of a downstream subsystem, such as a sortation subsystem. In high-speed material handling systems, such merging is often accomplished by use of one of two merge modes, a zippering merge mode or a slug-building merge mode. In the zippering merge mode, individual articles are released from a plurality of feed conveyors such that the articles are timed to be interleaved, or zippered, together with other articles released from the feed conveyors into a single file, with the appropriate inter-article gap between the articles. The zippering merge mode may utilize inter-article gaps between articles of different lines to avoid interference issues related to the articles of the different lines. In the slug-building merge mode, articles are accumulated into groups on a plurality of feed conveyors, with appropriate, minimal inter-article gaps between the articles in respective groups. Such groups are typically referred to as "slugs" or "trains." Articles may be delayed on a staging conveyor until the slug is completed (or accumulated), at which time the articles of the built slug are released as a group. The time required to build a slug may be referred to as "slug-building overhead." The slugs are selectively released, timed to be interleaved with other slugs, with the appropriate inter-slug gap between the slugs.

The performance (i.e., throughput of articles) of merge subsystems utilizing these two types of merge modes may depend on many things, including the speed of the merge, article lengths, and the sequence and timing of the arrival of articles at a merge conveyor. Since the zippering merge mode does not build slugs but instead utilizes inter-article gaps between articles from different conveyors, the zippering merge mode typically can deliver higher performance for a few input lines (e.g., approximately three to five input feed conveyors). As the number of input lines (e.g., feed conveyors) increases, the zippering merge mode performance reaches a maximum and may not increase with the addition of more input lines. In contrast, the slug-building merge mode takes time to build slugs and experiences "slug-building overhead," making the slug-building merge mode less effective than the zippering merge mode when there are only a few input lines. However, once the number of input lines is large enough, the slug-building overhead is overcome and performance may be higher than the zippering merge mode.

During the design phase of a material handling system, a choice between the two merge configurations is typically made. Thus, from the design phase, typical material handling systems are either zipper merge systems or slug merge systems. Even when one of the two merge configurations is a clear choice for a given material handling system, there may be system conditions during operation of the material handling system that would be better handled by a different merge strategy than the one chosen.

SUMMARY

The various embodiments provide methods, devices, non-transitory processor-readable storage media, and systems for operating a material handling system including a plurality of feed conveyors. In an embodiment, a computing device may be configured to perform operations that may include configuring each feed conveyor in the plurality of feed conveyors to operate in a slug-building merge mode, monitoring to identify a first predefined condition, configuring each feed conveyor in the plurality of feed conveyors to operate in a zippering merge mode in response to identifying the first predefined condition, monitoring to identify a second predefined condition, and configuring a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition. In another embodiment, a computing device may be configured to perform operations that may include configuring a first set of feed conveyors in the plurality of feed conveyors to operate in a slug-building merge mode, wherein the first set of the feed conveyors in the plurality of feed conveyors are capable of operating in either the slug-building merge mode or a zippering merge mode, and configuring a second set of the feed conveyors in the plurality of feed conveyors to operate in the zippering merge mode, wherein the second set of the feed conveyors are dedicated to the zippering merge mode.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of laptop computers, servers, personal computers, and similar electronic devices equipped with at least a processor. In various embodiments, such devices may be configured with a network interface to establish a wide area network (WAN) or local area network (LAN) connection (e.g., an LTE, 3G or 4G wireless wide area network transceiver, a wired connection to the Internet, or WiFi).

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "processor" is used herein to refer to devices which can be configured to perform the various functionality set forth in this disclosure, either individually or in combination with other devices. Examples of processors may include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The term "processing system" may be used to refer to one or more processors, which may be included in a single device, or distributed among multiple physical devices.

Figure 1:
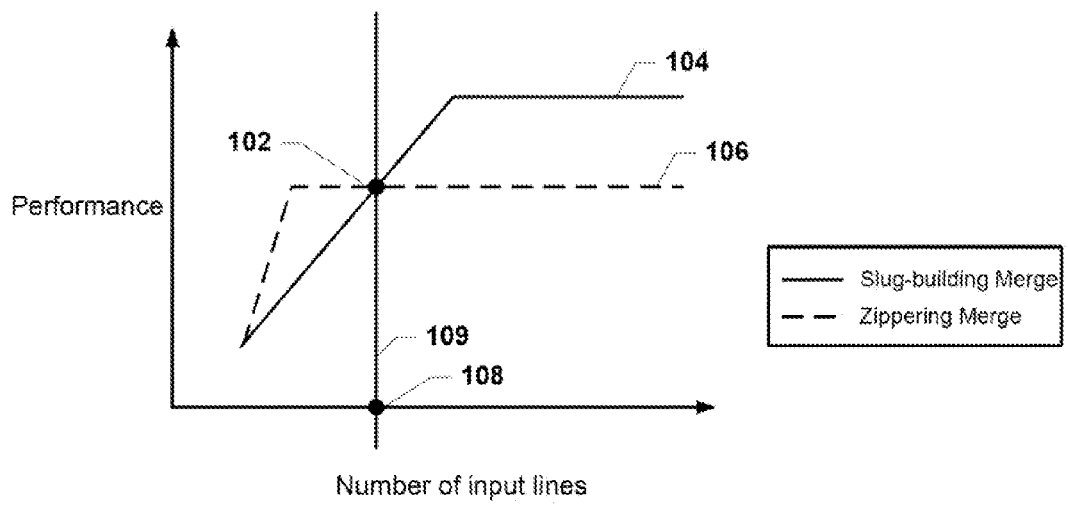
FIG. 1 illustrates a graph diagram illustrating performance information for slug-building and zippering merge techniques.

The decision to implement or build a material handling system utilizing a zippering merge or a slug building merge may be made using information as shown in the diagram of FIG. 1. In particular, FIG. 1 visually illustrates a comparison of the performance of slug-building and zippering merge modes based on a number of input lines (e.g., feed conveyors). The performance of the zippering merge mode is shown with line 106, and the performance of the slug-building merge mode is shown with line 104. Typically, the performance of the zippering merge mode plateaus at approximately four to five input lines. An "inflection point" 102 represents the intersection of the performances of the two merge styles with increasing numbers of input lines. The inflection point 102 may be considered a true inflection point or a 'knee' in a performance curve, such as a curve comprised of the portion of the zippering merge performance line 106 to the left of the inflection point 102 and the slug-building merge performance line 104 to the right of the inflection point 102. The inflection point 102 may serve as the operational decision point for when a merge subsystem may switch from a zippering merge mode to a slug-building merge mode, as described below with reference to the various embodiments of this disclosure.

An intersection point 108 is shown in FIG. 1 and corresponds to the intersection of the vertical line 109 from the inflection point 102 and the horizontal axis associated with the number of input lines (e.g., number of feed conveyors in a merge subsystem). The intersection point 108 may indicate a quantity of input lines that may determine whether a merge subsystem should be configured to implement a zippering merge mode or a slug-building merge mode. In particular, there may be better performance from a zippering merge mode when the quantity of input lines in a merge subsystem is below the value corresponding to the intersection point 108. Alternatively, there may be better performance from a slug-building merge mode when the quantity of input lines in a merge subsystem is above the value corresponding to the intersection point 108.

However, determining where the "inflection point" 102 is for a given merge subsystem (and thus the number of inputs lines corresponding to the intersection point 108) is not an exact science. And, as stated above, even when an appropriate merge configuration for a merge subsystem seems clear during the design of a material handling system, conditions may change over time. For example, when using a certain merge configuration, the material handling system may not require all input lines to be in use because the product that would arrive on those input lines might not be needed to fill the orders being shipped. As another example, some areas related to such a material handling system may require only a few items while other areas require many items. When such changes occur (e.g., when the quantity of input lines currently needed in a merge subsystem falls below the value associated with the intersection point 108 of FIG. 1), it may be advantageous for a merge subsystem to be configured to operate in zipper and/or slug-building merge mode. Such a changeover between modes in a typical material handling system may be costly and disruptive, and so it would be beneficial to avoid unnecessary mode changes and utilize a system capable of easily and efficiently switching merge modes.

For the purposes of simplicity in the following descriptions, the term "feed conveyor" may be considered interchangeable with the term "input line" used above. However, those skilled in the art should appreciate that input lines may also be referred to as lanes and further may not only include feed conveyors.

The various embodiments feature devices, systems, methods, and non-transitory processor-readable storage medium (or media) for configuring a material handling system, such as within a warehouse or distribution center, to perform zippering merge operations, slug-building merge operations, and/or both zippering and slug-building merge operations simultaneously. For example, a first and a second feed conveyor in an embodiment material handling system may both be configured to operate in a slug-building merge mode (or interleaving mode) for a first period and then operate in a zippering merge mode (or interleaving mode) for a second period after all built slugs have been released. However, in response to the occurrence of a predefined condition (e.g., detection of a certain number of active or inactive feed conveyors in the system, etc.), the first feed conveyor may then be configured to switch to operate in a slug-building merge mode while the second feed conveyor continues to operate in the zippering merge mode.

In an embodiment, a computing device, such as a server, desktop computer, or laptop computer affiliated with the material handling system, may be configured to control various operations and components of the material handling system and therefore may change the active merge modes of feed conveyors. In particular, a processor or controller coupled to or otherwise utilized by the computing device may be configured to execute instructions, applications, software, scripts, commands, and/or other routines to change the active merge modes of individual feed conveyors within the material handling system. For example, in response to detecting a predefined condition, such as a user input or sensor data, the processor of the computing device may perform operations to configure one or more feed conveyors in a plurality of feed conveyors in the material handling system to operate as a "zipper" (i.e., in a zippering merge mode), or as a "slug" (i.e., in a slug-building merge mode). In other embodiments, the computing device may also be configured to configure feed conveyors to operate in other merge configurations, such as a "wedge" or "saw tooth" merge mode.

In another embodiment, the computing device may automatically configure feed conveyors to switch in between active merge modes based on identified predefined conditions. For example, the computing device may continually and/or periodically evaluate predefined conditions, such as the number of conveyors reported to be active, and may perform operations to instruct conveyors within the material handling system to switch active merge modes when the predefined conditions are met (e.g., the number of active conveyors is above or below a predefined threshold value, etc.). In various embodiments, such predefined conditions may include a predetermined time period, the number of active feed conveyors, a current accumulation state, a number of active upstream feed conveyors, a number of active downstream feed conveyors, and a window of active feed conveyors. In an embodiment, the computing device may detect the occurrence of predefined conditions as a runtime determination. Predefined conditions may be identified based on monitoring sensor data or other input data received at the computing device from various components within the material handling system (e.g., sensors).

In another embodiment, the computing device may configure feed conveyors to switch in between active merge modes (e.g., cause a first feed conveyor to transition from building slugs in a slug-building merge mode to operating in a zippering merge mode and vice versa) in response to user inputs. For example, in response to receiving a user input on an input device (e.g., a click via mouse connected to the computing device), the computing device may perform operations to transmit instructions to upstream feed conveyors to operate in slug-building merge mode and transmit instructions to downstream feed conveyors to operate in zippering merge mode for a period.

In an embodiment, the material handling system may include a first set of feed conveyors that are configured to operate in the slug-building merge mode or the zippering merge mode and a second set of feed conveyors that are configured to operate only in the zippering merge mode. Alternatively, the first set of feed conveyors may be configured to operate in only the slug-building merge mode and the second set of feed conveyors may be configured to operate in the zippering merge mode or the slug-building merge mode. In other words, feed conveyors of a merge subsystem may be static or dedicated to a particular merge mode. In this way, the material handling system may support a smaller group of special feed conveyors (or lanes) for which a certain merge mode (e.g., zippering) is most efficient. The combination of such dedicated (or preconfigured) conveyors may enable the material handling system to maintain a diverse functionality that also utilizes the most beneficial merge mode on an individual conveyor basis.

In various embodiments, when a merge subsystem is configured to operate zippering and slug-building merge modes at the same time, downstream feed conveyors may typically be configured to perform zippering merge operations and upstream feed conveyors may be configured to perform slug-building merge operations. This merge mode assignment technique may be useful as it may be easier to slip a single article from a zippering downstream feed conveyor into a line of slugs and/or individual articles on a takeaway conveyor than to slip a slug from a slug-building downstream feed conveyor in order to fill "holes" in the line on the takeaway conveyor. In other words, if downstream feed conveyors were configured to operate in slug-building merge mode, the feed conveyors would need to wait for a big hole in the takeaway conveyor in order to place their slugs. Therefore, it is more advantageous for the single articles from zippering feed conveyors to be downstream.

As typical material handling systems and corresponding hardware (e.g., motors, conveyors, computing devices, etc.) are often designed to statically utilize only one merge mode, the techniques of this disclosure may be useful to provide a dynamic, versatile manner for performing merge operations in the most efficient mode given current circumstances of a material handling system. In particular, the various embodiments may improve a material handling system to be capable of utilizing the same hardware for both zippering and slug-building merge modes of operation. In other words, embodiment systems may be configured to switch between merge modes and/or perform different merge modes simultaneously. With such versatility, material handling systems may be designed to be scalable, with conveyors configurable to use zippering merge operations for smaller workloads (e.g., work requiring up to approximately three to five feed conveyors) and/or configurable to use slug-building merge operations for larger workloads (e.g., work requiring more than approximately three to five feed conveyors, such as ten conveyors).

Figure 2:
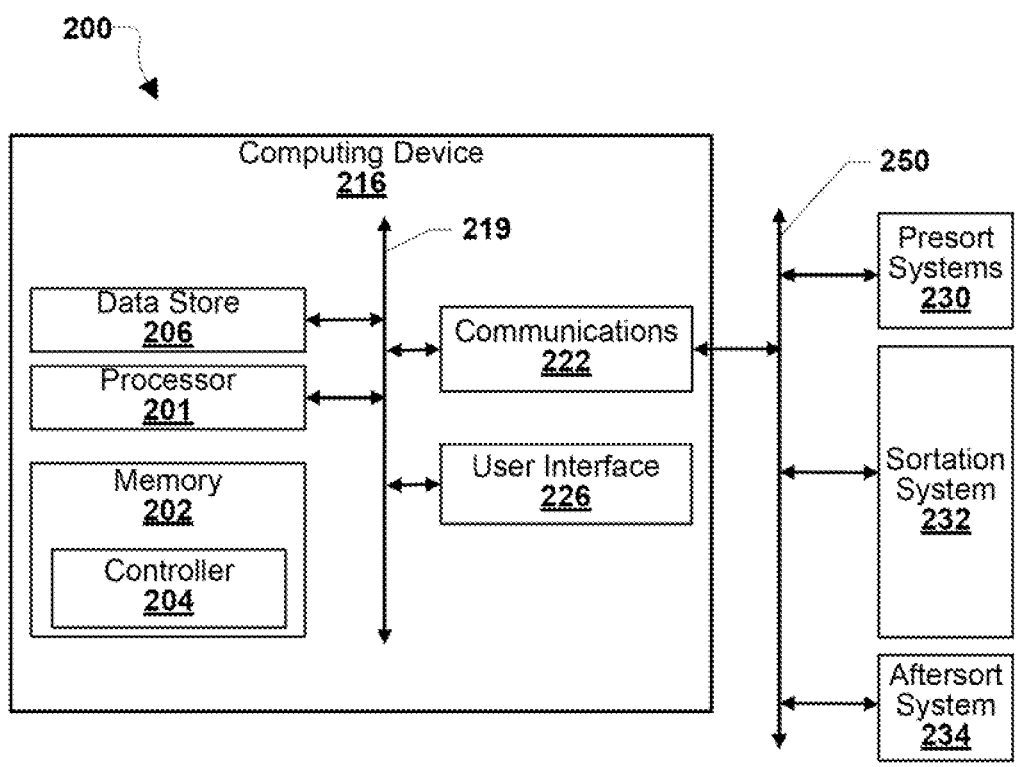
FIG. 2 illustrates a schematic block diagram of a material handling system according to one or more embodiments.

In FIG. 2, an embodiment material handling system 200 may include a presort system 230, and an aftersort system 234, and a sortation system 232. In general, the sortation system 232 may receive articles (e.g., boxes, items, etc.) from presort systems 230 and sort these articles to aftersort systems 234. The presort system 230 may include a plurality of feed conveyors (or input lines) on which articles may be directed to accumulation lanes for slug and/or zippered release onto a merge conveyor, which in turn may carry the articles onto an induct conveyor for being identified by a scanner and other operations in the sortation system 232. In an embodiment, sorting processes may be under overall control by a warehouse management system (or WMS). For example, the WMS may track articles that arrive in a receiving area, that are buffered in an Automated Storage and Retrieval System (ASRS), and that depart the material handling system 200 in a shipping area.

The material handling system 200 may include a computing device 216 that may be in communication with the various systems 230-234 via an external communication bus 250. In another embodiment, the computing device 216 may be in communication with the various systems 230-234 via a local area network, such as via wired or wireless links to a WiFi router of the local area network.

The computing device 216 may include various components, such as at least one processor 201, and a memory 202. The memory 202 may be for storing local versions of applications being executed by the at least one processor 201. In one embodiment, the computing device 216 may include a controller 204 that may be stored or otherwise implemented within the memory 202 of the computing device 216. In an embodiment, the controller 204 may be a separate module within the computing device 216. The at least one processor 201 may be configured to execute or otherwise process functions associated with one or more of components and functions described herein and may exchange data and/or otherwise communicate via an inner communication bus 219. In various embodiments, the processor 201 may include a single or multiple set of processors or multi-core processors, or alternatively, may be implemented as an integrated processing system and/or a distributed processing system. The memory 202 may include any type of memory usable by a computer, such as random access memory (RAM), read only memory (ROM), tapes, magnetic discs, optical discs, volatile memory, non-volatile memory, and any combination thereof.

Further, computing device 216 may include a communications component 222 that provides for establishing and maintaining communications with one or more devices (or parties) utilizing hardware, software, and services as described herein. The communications component 222 may carry communications between components on computing device 216, as well as between the computing device 216 and external devices, such as devices located across a communications network and/or devices serially or locally connected to computing device 216. For example, communications component 222 may include one or more buses, depicted as the external communication bus 250 and the inner communication bus 219 and further may include transmit chain components and receive chain components associated with a transmitter and receiver, respectively, operable for interfacing with external devices. In an embodiment, the communications component 222 may receive input signals, such as signals from sensors within the material handling system 200, and/or transmit output signals, such as output signals to motor devices associated with feed conveyors.

Additionally, computing device 216 may further include a data store component 206, which may be any suitable combination of hardware and/or software, that provides for mass storage of information, databases, and programs employed in connection with embodiments described herein. For example, data store component 206 (or device) may be a data repository for applications not currently being executed by processor 218.

Computing device 216 may additionally include a user interface component 226 operable to receive inputs from a user of computing device 216, and may be further operable to generate outputs for presentation to the user, such as via a visual display (e.g., LCD monitor, etc.). User interface component 226 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 226 may include one or more output devices, including but not limited to a display, a speaker, a haptic feedback mechanism, a printer, any other mechanism capable of presenting an output to a user, or any combination thereof.

In an embodiment, the controller 204 may be configured to adjust the sortation system 232 based upon monitoring or controlling presort system 230 (e.g., receiving conveyors, automatic storage and retrieval systems (ASRS), manufacturing systems, etc.) or aftersort systems 234 (e.g., packing stations, shipping docks, ASRS, etc.). For example, a WMS may be a source of information about a presort system 230 or an aftersort system 234. The controller 204 may be configured to monitor and utilize inputs, such as from a warehouse management system, sensors on accumulation lanes within the material handling system, photo eyes on a recirculation conveyor, and sensors on take-away conveyors. For example, the controller 204 may compare input values to predefined thresholds.

Figure 3:
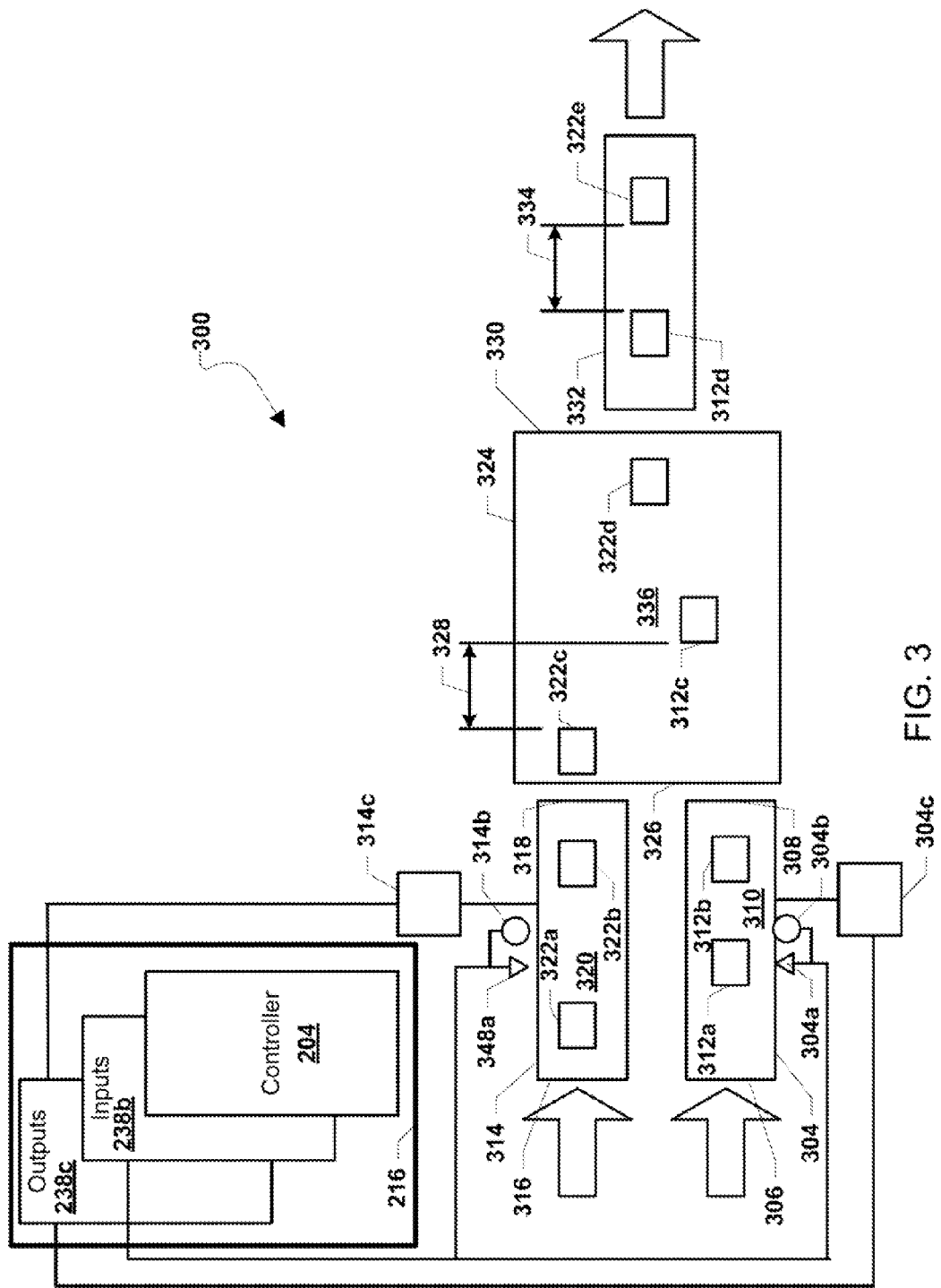
FIG. 3 is a diagrammatic plan view of a two feed conveyor (or lane) combiner merge configuration operating in a zippering merge mode.

FIG. 3 illustrates a diagram of a two conveyor (or lane) combiner merge configuration operating in a zippering merge mode corresponding to an embodiment material handling system. The physical configuration of merge subsystem 300 may generally be referred to as a combiner merge configuration.

The feed conveyor 304 may have an infeed end 306 and a discharge end 308, and may include a conveying surface 310 which may be configured to convey articles 312a, 312b in a downstream direction toward the discharge end 308. Similarly, the feed conveyor 314 may include an infeed end 316 and a discharge end 318, and may include a conveying surface 320 which may be configured to convey articles 322a, 322b in a downstream direction toward the discharge end 318.

The feed conveyors 304, 314 may receive articles at their respective infeed ends 306, 316, from a respective upstream conveyor or subsystem, such as an accumulation conveyor. The feed conveyors 304, 314 may be disposed to discharge articles carried thereon onto the takeaway conveyor 324. The feed conveyors 304, 314 respectively may function to meter articles onto the takeaway conveyor 324. Although diagrammatically illustrated as a single rectangle, in the embodiment depicted, each feed conveyor 304, 314 may comprise a brake-meter conveyor, which may be well known in the art, that allows gaps to be created between pairs articles as articles transition through the speed change of the brake meter conveyor.

The merge subsystem 300 is depicted as operating in a zippering merge mode, in which individual articles arriving at the merge subsystem along a plurality of paths are merged into a single file by interleaving the articles, with the release decision being made based on an individual article by individual article basis with consideration given to attributes (e.g., size, length, location, speed) of other articles either arriving at the merge on the other paths or already released to the takeaway conveyor. Articles 312a, 312b and 322a, 322b, may then be released onto the takeaway conveyor 324 at an infeed end 326, still longitudinally aligned with the respective feed conveyor 304, 314, timed such that appropriate inter-article gaps 328 exist between sequential articles, such as 312c and 322c, so that when they are merged into single file and discharged single file from discharge end 330 onto takeaway conveyor 332, appropriate inter-article gaps 334 exist, such as between articles 312d and 322e.

The takeaway conveyor 324 may be sized wide enough to accommodate the number of feed conveyors of merge subsystem 300. Although two feed conveyors 304, 314 are illustrated, any suitable number of feed conveyors may be used. In the configuration depicted, the takeaway conveyor 324 is a combiner, and may be configured to cause articles carried by the conveying surface 336 thereof to be in single file, aligned with takeaway conveyor 332 by the time articles reach discharge end 330, such as shown by article 322d. Such configuration may be well known, such as sliding shoes or vertical roller or belt conveyors which overlie conveying surface 336 converging toward discharge end 330.

It should be noted that as the takeaway conveyor 324 receives articles from all the feed conveyors 304, 314 in such a zippering merge subsystem 300, it may not be feasible for the merge subsystem 300 to include more than a small number of feed conveyors (e.g., two or three feed conveyors), as the takeaway conveyor 324 would be required to be wider than may typically be supported. In other words, the merge subsystem 300 may not be well-suited to handle many feed conveyors, and thus may not be well-suited for being configured to operate in a slug-building merge mode that typically utilizes many feed conveyors (e.g., 10 feed conveyors, etc.). Also, for accumulating slugs, typical slug-building merge systems may require longer belts than are used in typical dedicated zippering merge subsystems, such as merge subsystem 300. Accordingly, a merge subsystem 300 designed to only perform zippering merge operations may not be capable of also efficiently performing slug-building operations, as only a small number of feed conveyors may be supported.

An exemplary control for feed conveyor 304, 314, is illustrated comprising a computing device 216 which may be in communication with the merge subsystem 300, and may receive inputs (or input signals) via an input component 238b from article sensors 304a, 314a (e.g., photo eyes) disposed to detect articles on conveying surface 310, 320, and from conveyor position sensors 304b, 314b, such as pulse encoders. Such inputs via the input component 238b may be signals from sensing devices, such as photo eyes, encoders, limit switches. The computing device 216, which may have one or more processors and a controller 204, may comprise at least part of a processing system which may execute instructions to control the merge subsystem 300. In the embodiment depicted, logic for control of the merge subsystem 300 may be resident on the computing device 216 and may be accessible to the controller 204. The computing device 216 may be configured to execute instructions that implement the control logic, and further may communicate with the merge subsystem 300, such as through sending outputs (or output signals) via an output component 238c to motor and motor controls 304c, 314c (or motor devices), which may cause the timed release of articles from feed conveyors 304, 314 onto the takeaway conveyor 324 as described above. The outputs from the output component 238c may be signals to actuators, such as motors, solenoids, lamps, etc. In an embodiment, the output component 238c and the input component 238b may be included within a communications component 222, as described above with reference to FIG. 2.

Figure 4A:
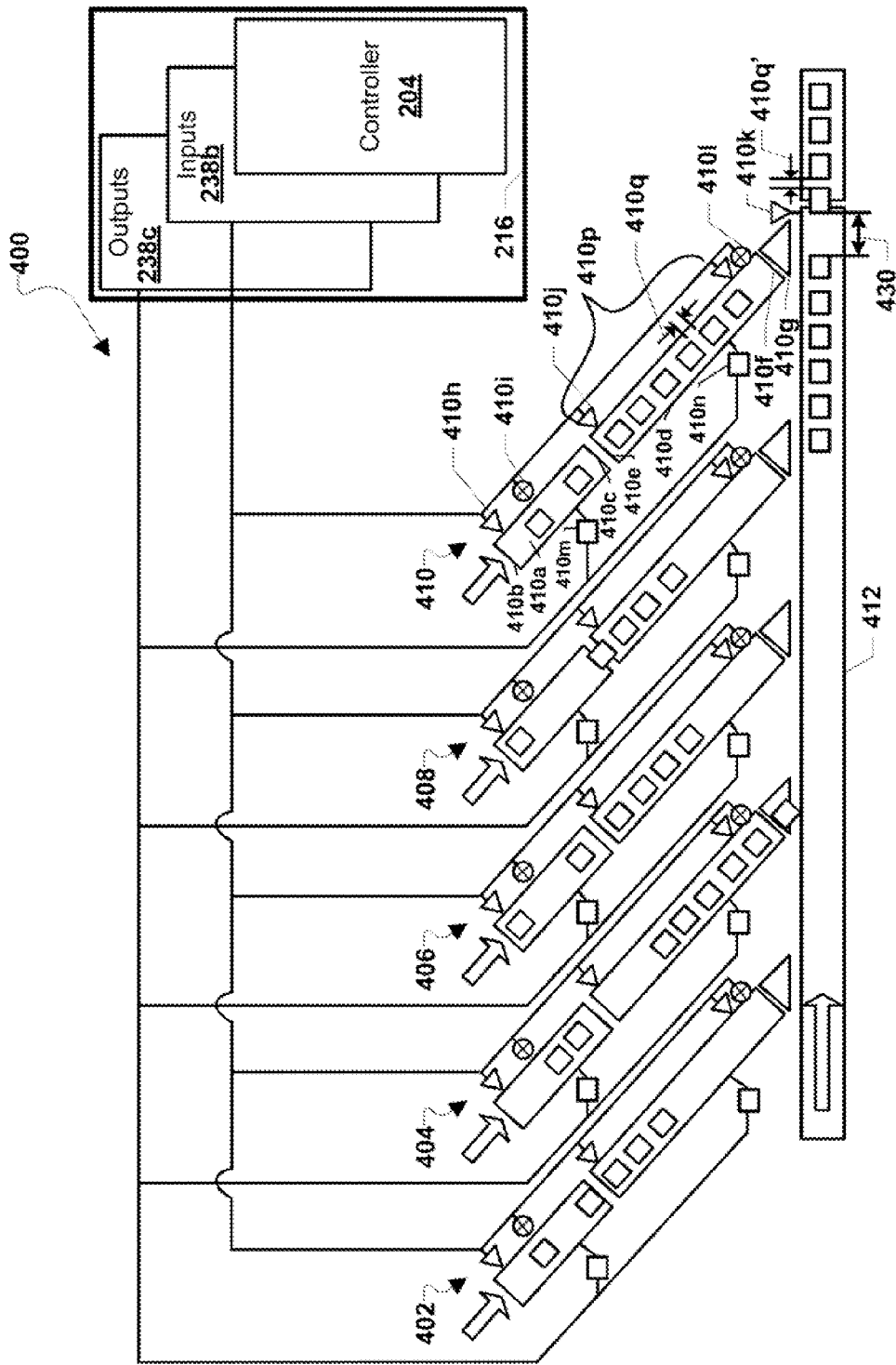
FIG. 4A is a diagrammatic plan view of a merge subsystem within a material handling system having a computing device executing instructions to cause the merge subsystem to operate in a slug-building merge mode.

FIG. 4A illustrates a diagram of an embodiment merge subsystem 400 within a material handling system having a computing device 216 executing instructions to cause the merge subsystem 400 to operate in a slug-building merge mode. The physical configuration of merge subsystem 400 may generally be referred to as a wedge merge configuration. A plurality of feed conveyors 402, 404, 406, 408, 410 are illustrated as being disposed to release articles onto takeaway conveyor 412. Each feed conveyor 402, 404, 406, 408, 410 may be disposed to receive articles from a respective upstream conveyor or subsystem, such as an accumulation conveyor. In the embodiment depicted, feed conveyors 402, 404, 406, 408 and 410 may be similarly configured, thus, for simplicity of explanation, the feed conveyor 410 will be described, it being recognized that the description is also applicable to other feed conveyors 402, 404, 406, and 408. It is noted that although five feed conveyors are illustrated, any suitable number of feed conveyors may be utilized. It is also noted that feed conveyors may be disposed on either side of the takeaway conveyor 412, disposed in non-uniformly spaced locations, disposed at non-uniform orientations, and may be physically different from each other in length, size and number of individual conveyor sections.

In the embodiment depicted, the feed conveyor 410 may include a metering conveyor 410a with an infeed end 410b and a discharge end 410c, a staging conveyor 410d with an infeed end 410e and a discharge end 410f, and a spur 410g. An article sensor 410h, such as a photo eye, may be disposed to detect articles on the conveying surface of metering conveyor 410a, and conveyor position sensor 410i, such as an encoder, may provide an output indicative of the movement of the metering conveyor 410a. Article sensors 410j, 410k may be disposed to detect articles on the conveying surface of a staging conveyor 410d, and a conveyor position sensor 410l may provide an output indicative of the movement of the staging conveyor 410d. Signals from article sensors 410h, 410j and 410k and from position sensors 410i and 410l may be received by the computing device 216 as inputs (or input signals) via an input component 238b. The computing device 216, which may have one or more processors and also may include a controller 204, may comprise at least part of a processing system which executes instructions to control the merge subsystem 400. In the embodiment depicted, logic for control of the merge subsystem 400 may be resident on the computing device 216, which may execute instructions that implement the control logic. The computing device 216 may communicate with the merge subsystem 400, such as through sending outputs (or output signals) from an output component 238c to motor and motor control 410m, 410n (or motor devices) to cause the merge subsystem 400 to operate in an interleaving merge mode. In an embodiment, the output component 238c and the input component 238b may be included within a communications component 222, as described above with reference to FIG. 2.

The computing device 216, such as via the controller 204, may execute instructions which cause merge subsystem 400 to operate in a slug-building merge mode, in which individual articles arriving at the merge subsystem 400 on one of a plurality of paths are accumulated by the merge subsystem 400 to form respective slugs of articles, with each respective slug being selectively released such that the slugs are merged into a single file by interleaving the slugs, with the release decision being made based on a slug-by-slug basis with consideration given to attributes of other slugs available for release or already released to the takeaway conveyor.

Metering conveyor 410a, which in the embodiment depicted is a brake-metering conveyor, and staging conveyor 410d may be controlled in coordination by the computing device 216 (e.g., via the controller 204) to release articles from the metering conveyor 410a onto the staging conveyor 410d into a tightly packed slug 410p with a minimal gap 410q between individual articles. Once the slug 410p is available for release, such as when the staging conveyor 410d is full, control logic executed by the computing device 216 may determine when the slug 410p may be released to the takeaway conveyor 412 to be interleaved with slugs of other feed conveyors also ready for release or previously released. The computing device (e.g., via the controller 204) may time the release of slugs to create the desired amount of inter-slug gap 430. The inter-slug gap 430 may be a gap assigned between slugs, and may be a larger gap (e.g., 6 inches, 10 inches, etc.)

than the minimal gap 410*q* between individual articles of a slug (e.g., within a few inches). Once on the takeaway conveyor 412, a released slug may maintain the minimal gap 410*q*' between articles of the slug. It should be noted that the building of slugs on all the feed conveyors 402, 404, 406, 408, 410, occurs independently, and that slug building conditions on one feed conveyor may not affect the building of a slug on any other feed conveyor.

Figure 4B:
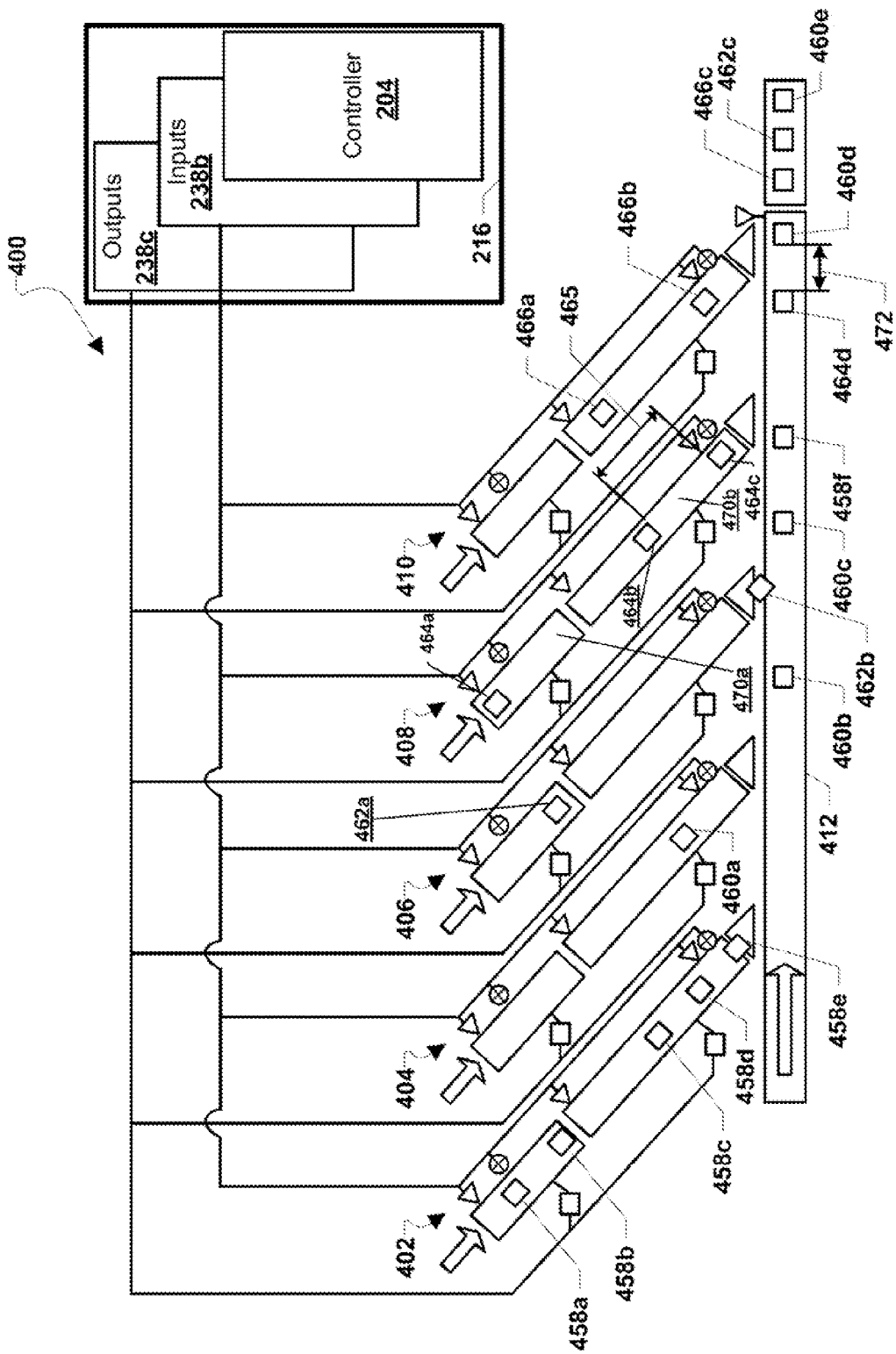
FIG. 4B is a diagrammatic plan view of a merge subsystem within a material handling system having a computing device executing instructions to cause the merge subsystem to operate in a zippering merge mode.

FIG. 4B illustrates a diagram of a merge subsystem 400 within an embodiment material handling system having a computing device 216 executing instructions to cause the merge subsystem 400 to operate in a zippering merge mode. The computing device 216 is illustrated executing instructions (e.g., via a controller 204) to cause merge subsystem 400 to operate in an interleaving, zippering merge mode. In other words, the computing device 216 may perform operations to configure the merge subsystem 400 to operate in slug-building (as shown in FIG. 4A) and/or zippering merge mode (as shown in FIG. 4B).

When the physical configuration shown in FIG. 4B is operated in zippering merge mode, individual articles may be merged into a single file by interleaving the individual articles. When operated in the zippering merge mode, the staging belts of feed conveyors 402, 404, 406, 408 and 410 may not stage, but may run at a constant speed, receiving articles and discharging them onto the spur conveyors and onto the takeaway conveyor 412. The computing device 216, such as via the controller 204, may time the release of articles by the metering conveyors taking into account the travel time on the respective staging conveyors, so as to merge articles single file on to the takeaway conveyor 412 with the appropriate inter-article gap. As depicted, articles 458*a-f* may have arrived on feed conveyor 402, articles 460*a-e* may have arrived on feed conveyor 404, articles 462*a-c* may have arrived on feed conveyor 406, articles 464*a-d* may have arrived on feed conveyor 408, and articles 466*a-c* may have arrived on feed conveyor 410. As is illustrated, articles on the takeaway conveyor 412 may not be grouped in slugs nor arranged in any particular order, but may be interleaved together on an individual article basis. For example, article 462*b* is illustrated as in the act of being discharged onto the takeaway conveyor 412, to a position interleaved between article 460*c* and article 460*b*. Articles 464*b* and 464*c* are illustrated as being on staging conveyor 470*b*, already released by metering conveyor 470*a* and separated by an inter-article gap 465 on a belt. Article 464*c* may be merged onto the takeaway conveyor 412 interleaved between article 458*f* and 460*c*, with article 464*b* being merged onto the takeaway conveyor 412 interleaved between article 462*b* and 460*b*. An inter-article gap 472 between articles from different feed conveyors, such as between article 464*d* and 460*d* on the takeaway conveyor 412, may be larger than gaps typically between articles within slugs, such as gap 410*q* described above. In an embodiment, the gap 472 may be a number of inches in length (e.g., 6 inches, 10 inches, etc.)

Thus, the computing device 216, such as via the controller 204, may configure or otherwise cause the merge subsystem 400 to operate in a slug-building merge mode and/or in a zippering merge mode. The merge mode of a single physical merge configuration may be selected by the computing device 216 based on system conditions to increase the performance of merge subsystem 400. The selection of modes may be manually selected, such as based on user input. Alternatively, the selection may be done automatically by the computing device 216. For example, based on received sensor data inputs that represent system conditions, the computing device 26 may execute instructions to configure the merge subsystem 400 to operate in the zippering merge mode when a first set of predefined conditions exist and to execute instructions to operate the merge subsystem 400 in the slug-building merge mode when a second set of predefined conditions exist. It is noted that when switching the operation of merge subsystem 400 from one interleaving merge mode (e.g., slug-building merge mode) to another interleaving merge mode (e.g., zippering merge mode), articles that were inducted into merge subsystem 400 under the "old" merge mode should be allowed time to "clear out" before the "new" merge mode becomes fully functioning.

Figure 4C:
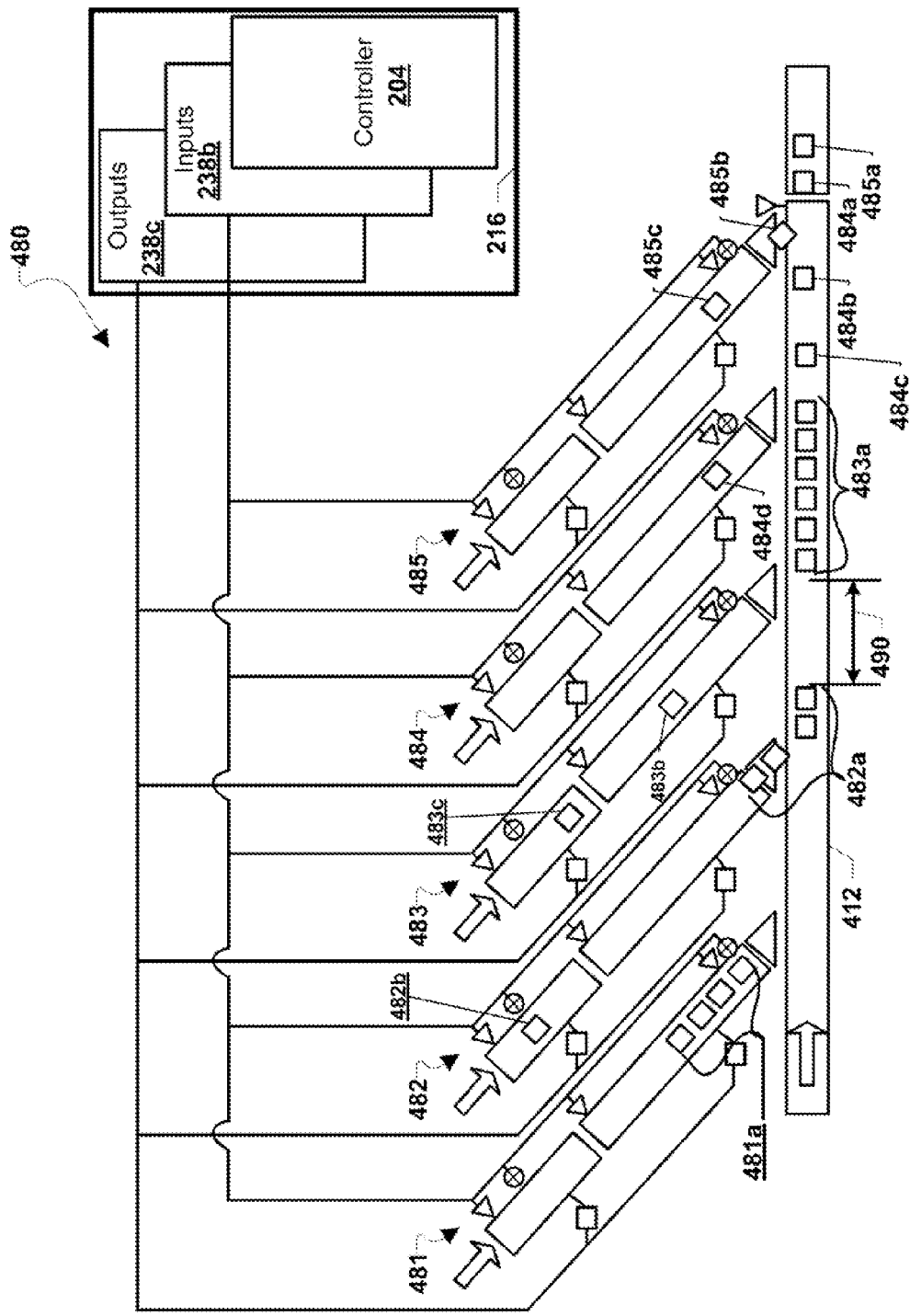
FIG. 4C is a diagrammatic plan view of a merge subsystem within a material handling system having a computing device executing instructions to cause the merge subsystem to operate in a slug-building merge mode for a first set of conveyors and operate in a zippering merge mode for a second set of conveyors.

FIG. 4C illustrates a diagram of a merge subsystem 480 within a material handling system having a computing device 216 executing instructions to cause the merge subsystem 480 to operate in a slug-building merge mode for a first set of conveyors and operate in a zippering merge mode for a second set of conveyors. The merge subsystem 480 may be similar to the merge subsystems described above, except that the merge subsystem 480 may be configured to utilize both the zippering and slug-building merge modes simultaneously (i.e., a hybrid merge configuration). In particular, the first set of feed conveyors operating in the slug-building merge mode may include feed conveyors 481, 482, and 483, and the second set of feed conveyors operating in the zipper merge mode may include feed conveyors 484 and 485.

In various embodiments, the feed conveyors of the first set or the second set may be dedicated (or pre-configured) to operate in their respective merge mode or configured on-demand. For example, the feed conveyor 485 may be permanently configured to operate in zippering merge mode. This may be useful when a material handling system requires a small, special set of processing, such as for a limited product line and/or product quantity. In an embodiment, dedicated zippering merge mode feed conveyors may or may not be capable of also performing slug-building merge mode operations. For example, the feed conveyors 484 and 485 may be configured to utilize belts, motors, sensors, or other equipment that may not be used to accumulate slugs.

When operated in the zippering merge mode, the staging belts of feed conveyors 484 and 485 may not stage, but may run at a constant speed, receiving articles and discharging them onto the spur conveyors and onto the takeaway conveyor 412. The computing device 216, such as via the controller 204, may time the release of articles by the metering conveyors taking into account the travel time on the respective staging conveyors, so as to merge articles single file on to the takeaway conveyor 412 with the appropriate inter-article gap. As depicted, articles 485*a-c* may have arrived on feed conveyor 485 and articles 484*a-d* may have arrived on feed conveyor 484. As is illustrated, articles from the feed conveyors 484 and 485 may not be grouped in slugs nor arranged in any particular order, but may be interleaved with articles (or slugs) from the various feed conveyors of the merge subsystem 480. For example, article 485*b* is illustrated as in the act of being discharged onto the takeaway conveyor 412, to a position interleaved between article 484*a* and article 484*b*. Article 485*c*, still not released on the takeaway conveyor 412, may be timed to be released in between article 484*b* and article 484*c*.

The computing device 216 may configure or otherwise cause the feed conveyors 481, 482, and 483 of the merge subsystem 480 to operate in a slug-building merge mode while the feed conveyors 484 and 485 are operating in a zippering merge mode. As described above, individual articles arriving at the merge subsystem 480 corresponding to one of the feed conveyors 481, 482, 483 are accumulated by the merge subsystem 480 to form respective slugs of articles, with each respective slug being selectively released such that the slugs are merged into a single file by interleaving the slugs and/or articles individually released by the feed conveyors 484, 485, with the release decision being made based on a slug-by-slug basis with consideration given to attributes of other slugs and individual articles available for release or already released to the takeaway conveyor. It should be noted that the building of slugs on all the feed conveyors 481, 482, 483 may occur independently, and that slug building conditions on one feed conveyor may not affect the building of a slug or release of individual articles on any other feed conveyor.

The computing device 216 may time the release of slugs by the metering conveyors based on the travel time and slug-building conditions of the various conveyors 481, 482, 483, 484, 485, so as to merge articles and slugs in a single file on to the takeaway conveyor 412 with the appropriate inter-article and/or inter-slug gaps. As depicted, the articles in slug 481*a* may have arrived on feed conveyor 481, the articles in slug 482*a* and article 482*b* may have arrived on feed conveyor 482, and the articles in slug 483*a* and articles 483*b* and 483*c* may have arrived on feed conveyor 483. Slug 483*a* is illustrated as already being released onto the takeaway conveyor 412 so that it is positioned after article 484*c* released from the feed conveyor 484 configured to operate in zippering mode. Slug 482*a* is illustrated as being in the state of being released onto the takeaway conveyor 412 so that it is positioned after slug 483*a* released from the feed conveyor 483 and timed so that there is a gap 490 in between slugs 483*a* and 482*a*. Accordingly, article 484*d*, still not released on the takeaway conveyor 412, may be timed to be released within the gap 490 in between slug 483*a* and slug 482*a*. Articles 483*b* and 483*c* may have arrive to be accumulated into a new slug at feed conveyor 483, and articles 482*b* may have arrived to be accumulated into a new slug at feed conveyor 482. Slug 481*a* is illustrated as being accumulated at feed conveyor 481 and about to be released onto the takeaway conveyor 412 so that it may be behind the slug 482*a*.

Figure 5A:
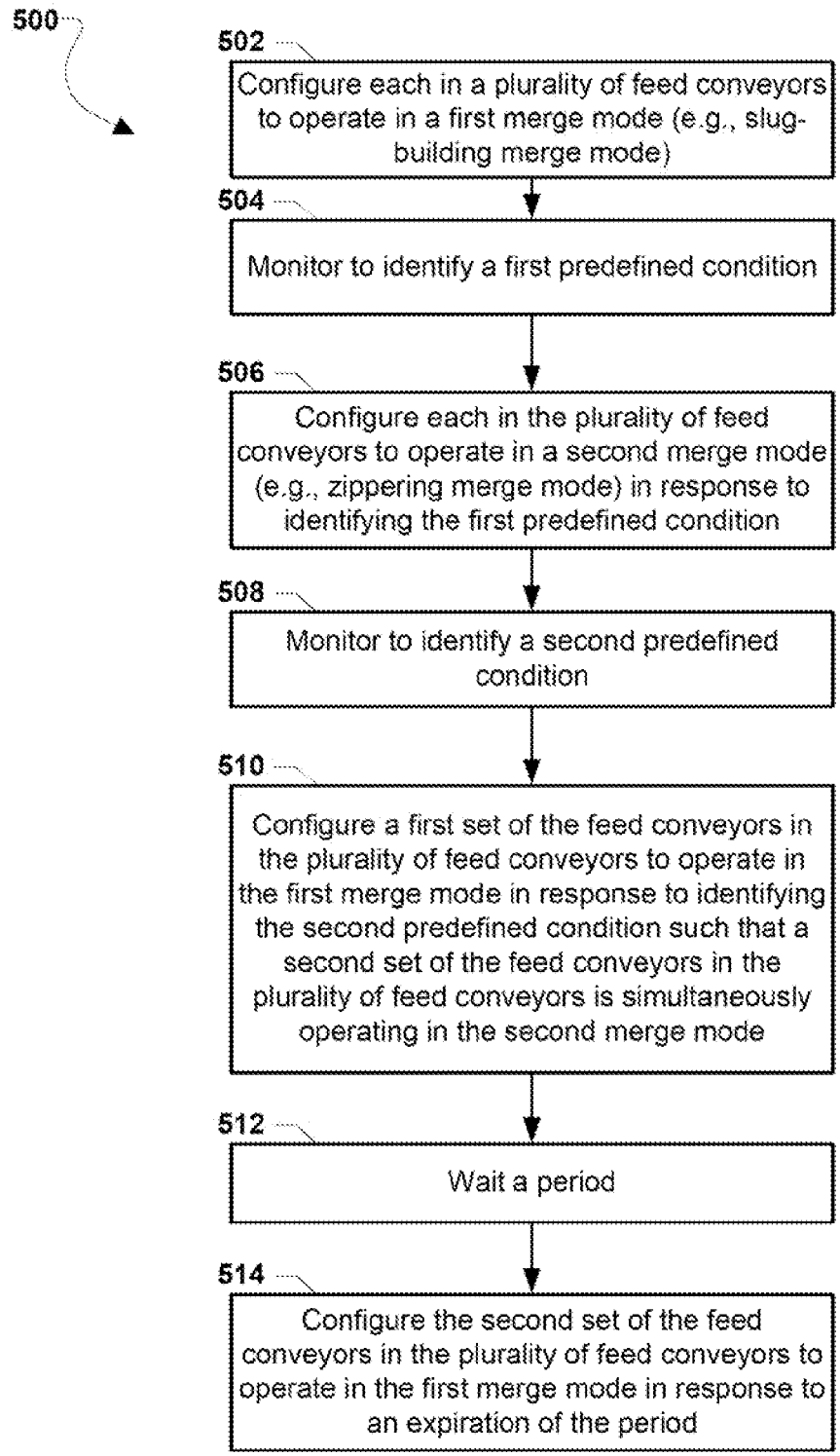
FIGS. 5A, 5B, and 6 are process flow diagrams illustrating embodiment method for a computing device within a material handling system to dynamically select a merge mode.

FIG. 5A illustrates an embodiment method 500 for a computing device within a material handling system to dynamically select a merge mode. In other words, the method 500 may be performed by the computing device to configure a material handling system to perform zippering merge operations and slug-building merge operations simultaneously. For example, the computing device may utilize functional logic for a controller to execute instructions which dynamically cause the controller to select the active merge mode for conveyors. There are many functional ways in which the computing device could be programmed to dynamically select between modes, and practice of this embodiment of the present innovation is not limited to the way illustrated in FIG. 5A. In various embodiments, the operations of the method 500 may be performed by any type of computing device, such as a laptop computer and/or a server. Additionally, the various operations may be described as being performed by a processor, however those with skill in the art should appreciate that the computing device associated with a material handling system may perform the operations via a controller as described above at least with reference to FIG. 2.

In block 502, the processor of the computing device may configure each in a plurality of feed conveyors to operate in a first merge mode. In various embodiments, the first merge mode may be one of a zippering merge mode or a slug-building merge mode as described within this disclosure. In block 504, the processor of the computing device may monitor to identify a first predefined condition, such as by monitoring information received from various sensors or devices within the material handling system (e.g., sortation subsystem, etc). For example, the computing device may monitor information that indicates how many articles are currently or about to be processed. The computing device may compare monitored information to predefined threshold values to identify the existence of a predefined condition. In an embodiment, the identifying the first predefined condition may include at least one of identifying whether the plurality of feed conveyors are currently handling articles, whether the plurality of feed conveyors have handled articles within a predetermined time period, whether a time period has expired, and whether a user input has been received. For example, the first predefined condition may be whether there are more active feed conveyors than a first predetermined number of active feed conveyors or whether there are fewer active feed conveyors than a first predetermined number of active feed conveyors.

In an embodiment, the identifying predefined conditions may include monitoring accumulation states of feed conveyors. For example, if an accumulation (i.e., all the conveyors that bring product to a merge section of a feed conveyor) is determined to be almost empty (e.g., no articles are coming to the merge section), then that feed conveyor may not be included in the number of available feed conveyors. As another example, if the accumulation state of the feed conveyor is full but has not arrived at the merge, then that feed conveyor may be included in the number of available feed conveyors, which may suggest the slug-building merge mode should be utilized.

In block 506, the processor of the computing device may configure each in the plurality of feed conveyors to operate in a second merge mode in response to identifying the first predefined condition. In various embodiments, the second merge mode may be one of a zippering merge mode or a slug-building merge mode, but may be different from the first merge mode. For example, the first merge mode may be the slug-building merge mode and the second merge mode may be the zippering merge mode. In various embodiments, the computing device may wait a period or otherwise perform confirmation routines before configuring the feed conveyors to switch to the second merge mode. For example, the computing device may monitor sensors and determine a time when slugs have been released to configure conveyors to switch into the zippering merge mode. In other words, slugs may need to be confirmed as fully removed from conveyors before those conveyors may be configured by the computing device to operate in zippering merge mode, and vice versa.

In block 508, the processor of the computing device may monitor to identify a second predefined condition. The operations in block 508 may be similar to those described above with reference to block 504. For example, the second predefined condition may be whether there are more active feed conveyors than a second predetermined number of active feed conveyors. In block 510, the processor of the computing device may configure a first set of the feed conveyors in the plurality of feed conveyors to operate in the first merge mode in response to identifying the second predefined condition such that a second set of the feed conveyors in the plurality of feed conveyors is simultaneously operating in the second merge mode. In an embodiment, the first set of the feed conveyors may be upstream feed conveyors. In an embodiment, the computing device may configure the first set to operate in the first merge mode (e.g., slug-building merge mode) after performing a confirmation that articles handled with the second merge mode (e.g., zippering) have been released from the various conveyors. In block 512, the processor of the computing device may wait a period, such as a predetermined period of time.

In block 514, the processor of the computing device may configure the second set of the feed conveyors in the plurality of feed conveyors to operate in the first merge mode in response to an expiration of a period after the first set of the feed conveyors in the plurality of feed conveyors is configured to operate in the first merge mode. In an embodiment, the second set of the feed conveyors may be downstream feed conveyors. Further, the first set and the second set may comprise all in the plurality of the feed conveyors. In an embodiment, the computing device may configure the second set to operate in the first merge mode (e.g., slug-building merge mode) after performing a confirmation that articles handled with the second merge mode (e.g., zippering) have been released from the various conveyors.

Figure 5B:
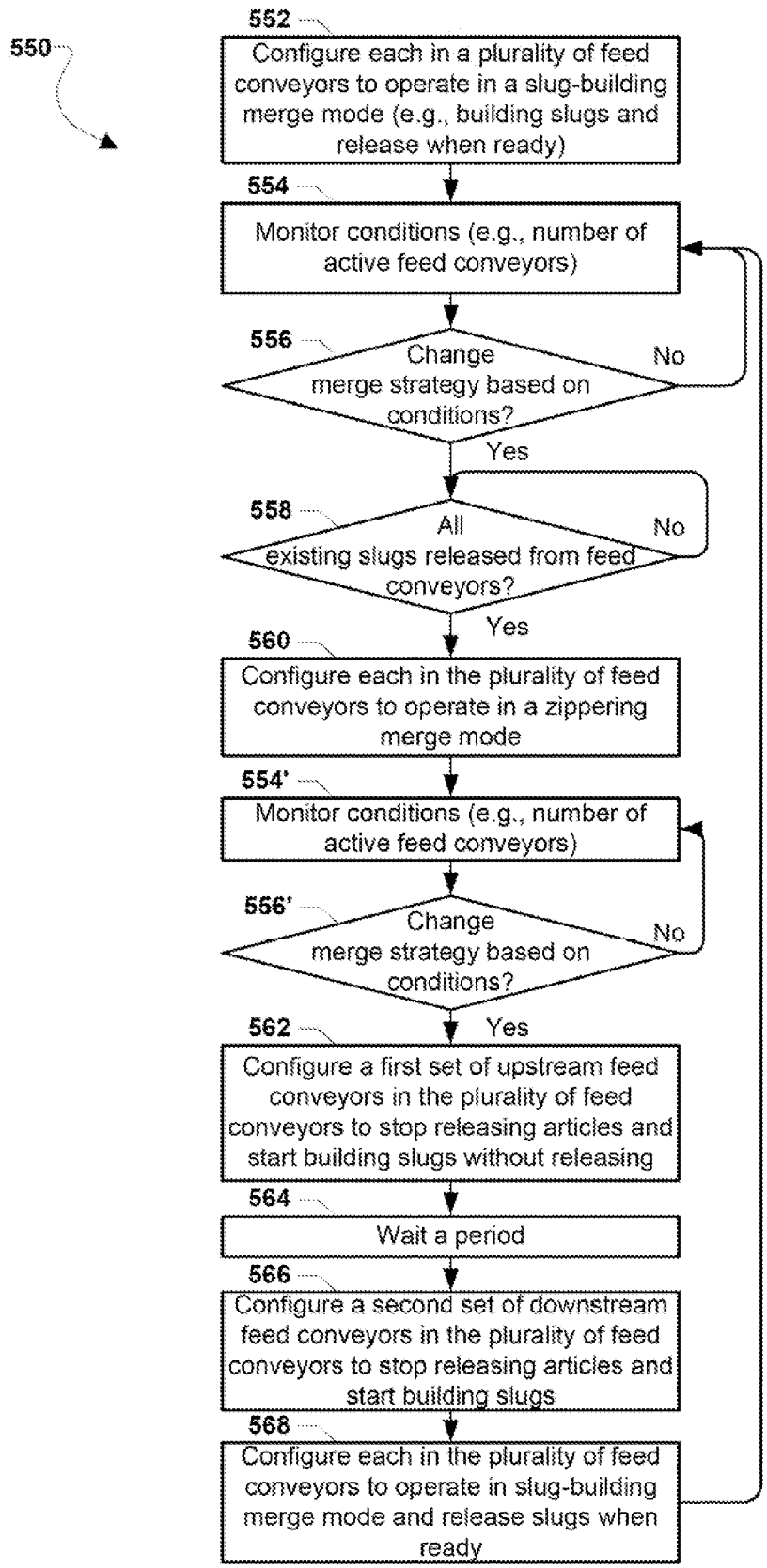

FIG. 5B illustrates an embodiment method 550 for a computing device within a material handling system to dynamically select a merge mode. The method 550 is similar to the method 500 described above, except that the method 550 may include operations wherein the first merge mode described above is a slug-building merge mode and the second merge mode described above is the zippering merge mode. In various embodiments, the operations of the method 550 may be performed by any type of computing device, such as a laptop computer and/or a server. Additionally, the various operations may be described as being performed by a processor, however those with skill in the art should appreciate that the computing device associated with a material handling system may perform the operations via a controller as described above at least with reference to FIG. 2.

In block 552, the processor of the computing device may configure each in a plurality of feed conveyors to operate in a slug-building merge mode. In other words, the computing device may configure conveyors within a merge subsystem (or sortation system), such as described above, to operate in an active slug-building merge mode wherein slugs may be amassed and released by the various conveyors. In block 554, all feed conveyors may be monitored by the processor of the computing device, such as by counting the number that are "active." The operations in block 554 may be similar to those described above in block 504. A feed conveyor may be considered active if it is in the act of handling articles, such as when articles are on the feed conveyor, or if it has handled articles within a predetermined time period. Other conditions could be considered in addition or instead of, such as whether a time period has expired or a user input has been received (e.g., a mouse input on a laptop executing a sortation controller).

In determination block 556, the processor of the computing device may determine whether to change the current merge mode (or merge strategy) of the plurality of feed conveyors based on whether at least one condition exists. The conditions may be criteria considered to be indicative that a situation exists in which switching the merge mode is expected to improve performance of a merge subsystem. In an embodiment, the conditions may include whether the number of active feed conveyors is less than a lower decision limit (i.e., a predefined value indicating the number of active feed conveyors below which a merge strategy change from slug-building merge mode to zippering merge mode should be implemented). For example, the less available or active feed conveyors, the more likely the computing device may determine to switch the merge subsystem to utilize a zippering merge mode. As another example, based on the monitoring, when it is determined that no articles have been detected for a predetermined amount of time on a feed conveyor, the computing device may be more likely to determine the merge subsystem may be configured to operate in zippering merge mode. As another example, when it is determined that the number of active conveyors is lower based on a user disabling a feed conveyor (and thus that feed conveyor would not be considered in the quantity of active conveyors), the computing device may be more likely to determine feed conveyors of the merge subsystem may be configured to operate in zippering merge mode. As another example, the computing device may monitor a quantity of active upper or lower feed conveyors or window of feed conveyors to determine whether to switch to zippering merge mode, as the merge subsystem may operate more efficiently (or easily) in zippering merge mode when the feed conveyors involved in zippering are close together.

If the computing device determines the at least one condition does not exist (i.e., determination block 556="No"), then the computing device may return to perform the operations in block 554. If the computing device determines the condition is determined to exist (i.e., determination block 556="Yes"), the merge strategy may be changed to the zippering merge mode by the processor of the computing device. The operations of the zippering merge mode may begin once the slug-building merge mode has been cleared out. Accordingly, in determination block 558, the processor of the computing device may determine whether all existing slugs have been released from the feed conveyors. If the computing device determines that not all slugs have been released (i.e., determination block 558="No"), the computing device may continue with the operations in determination block 558.

However, if the computing device determines that all slugs have been released (i.e., determination block 558="Yes"), the processor of the computing device may configure each in the plurality of feed conveyors to operate in a zippering merge mode in block 560. The computing device may consider each feed conveyor individually, and once an individual feed conveyor has been cleared of any slug, its merge mode may be switched to an active zippering merge mode. No feed conveyor that has switched to the zippering merge mode may release any article until all feed conveyors are clear of slugs. In an embodiment, instead of changing all feed conveyors, the computing device may configure only a portion of the feed conveyors in the merge subsystem to be changed to operate in the zippering merge mode, such as a predefined set of feed conveyors.

In block 554', similar to as described above with reference to the operations in block 554 or block 504, while the merge subsystem 40 is operating in the zippering merge mode, the processor of the computing device may monitor conditions and in determination block 556' may determine whether a change in the merge strategy should be executed based on whether at least one condition exists. In the depicted embodiments, the number of active feed conveyors (or lanes) may be counted and compared to an upper decision limit (or threshold value), such as the number of active feed conveyors (or lanes) above which the merge strategy should change from an active zippering merge mode to slug-building merge mode. Based on the consideration of conditions in block 554', the processor of the computing device either returns to perform the operations in block 554' to monitor conditions (i.e., determination block 556'="No"), or, if the merge strategy is to be changed (i.e., determination block 556'="Yes"), the processor of the computing device may proceed to perform the operations in block 562.

In block 562, the processor of the computing device may configure a first set of upstream feed conveyors in the plurality of feed conveyors to stop releasing articles and start building slugs without releasing the slugs. For example, one or more upstream feed conveyors, such as described above with reference to conveyors 402 and 404, may be configured by the processor of the computing device to immediately stop releasing articles, and switch to the slug-building merge mode, building slugs, but not releasing them. In an embodiment, the computing device may configure half of the upstream feed conveyors to start building slugs. Upstream feed conveyors may be selected to start building slugs because they are less likely to be blocked from releasing a slug, once built, than downstream feed conveyors.

In block 564, the processor of the computing device may wait a period, such as a predefined time delay period, during which the downstream conveyors may continue to operate in the zippering merge mode. In an embodiment, the time delay may be a predetermined time delay, or may be based on the monitoring the building of slugs on the upstream feed conveyors, proceeding to perform the operations in block 566 when the slugs are considered large enough.

In block 566, after the time delay expires, the processor of the computing device may configure a second set of downstream feed conveyors in the plurality of feed conveyors to stop releasing articles and start building slugs. In other words, the downstream feed conveyors may be configured to stop releasing articles in the zippering merge mode and start building slugs. The time delay may allow time for the upstream feed conveyors to build slugs for release while the downstream feed conveyors begin building slugs in block 566.

In block 568, the processor of the computing device may configure each in the plurality of feed conveyors to operate in slug-building merge mode and release slugs when ready. In other words, each feed conveyor (or lane) may be in the slug-building merge mode wherein slugs may be released when ready. The processor of the computing device may then return to perform the monitoring operations in block 554.

Figure 6:
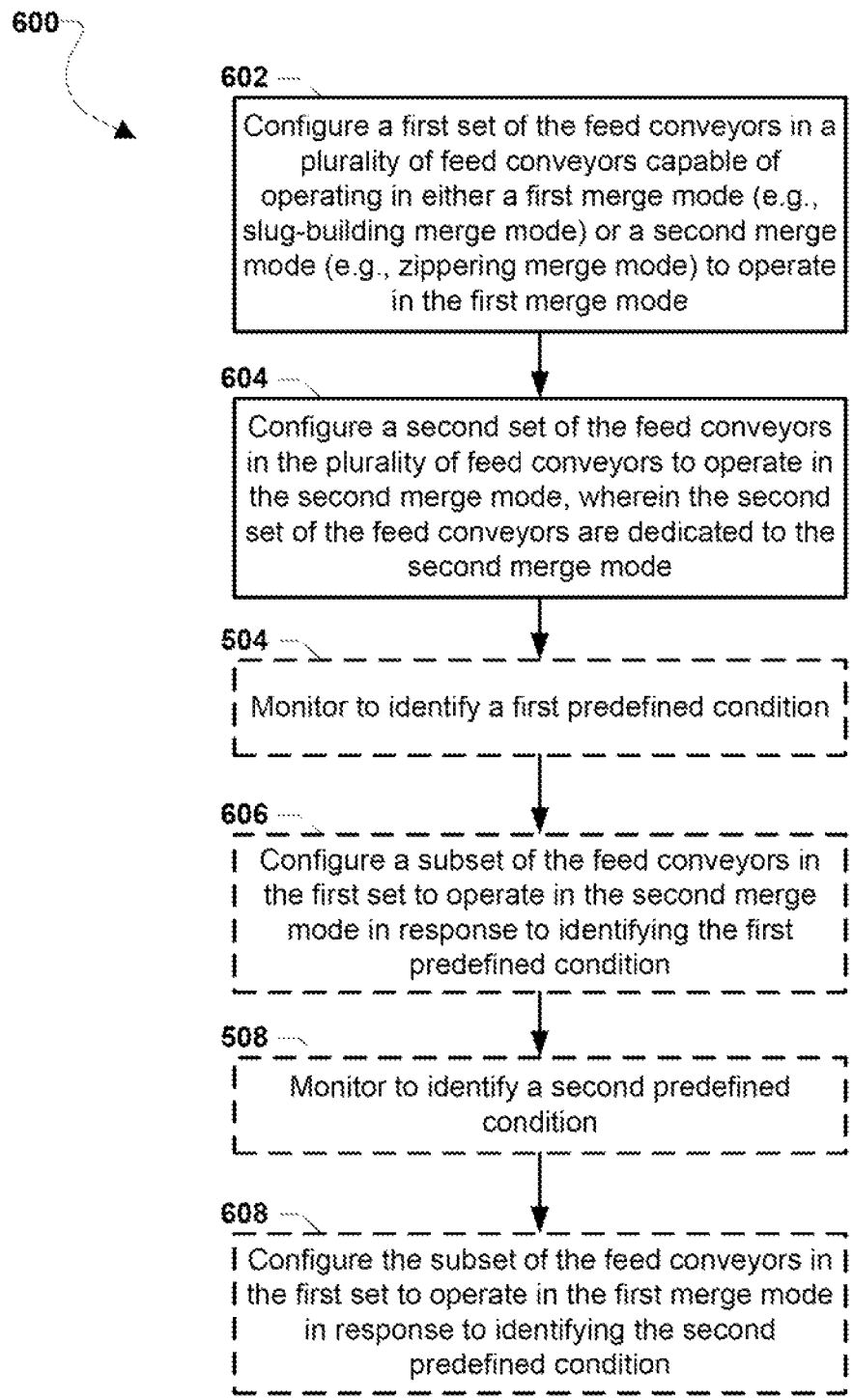

FIG. 6 illustrates an embodiment method 600 for a computing device within a material handling system to configure various conveyors capable of operating in various merge modes to statically operate in particular merge modes. The method 600 is useful in that it may enable a material handling system to have dedicated lanes or feed conveyors for special merge operations, such as for special or limited products. In an embodiment, the material handling system may re-purpose a subset of its conveyors, such as a few downstream conveyors, to simultaneously perform operations according to a zippering merge mode while the rest of the conveyors in the system, such as the upstream conveyors, perform operations according to a slug-building merge mode. In an alternative embodiment, downstream conveyors configured to perform zippering merge operations may only be capable of performing the zippering merge mode, whereas the upstream conveyors may be capable of performing either slug-building or zippering merge mode operations based on instructions from the computing device.

In block 602, the processor of the computing device may configure a first set of the feed conveyors in a plurality of feed conveyors capable of operating in either a first merge mode (e.g., slug-building merge mode) or a second merge mode (e.g., zippering merge mode) to operate in the first merge mode. In block 604, the processor of the computing device may configure a second set of the feed conveyors in the plurality of feed conveyors to operate in the second merge mode, wherein the second set of the feed conveyors are dedicated to the second merge mode (e.g., the zippering merge mode). Similar to as described above, in optional block 504, the processor of the computing device may monitor to identify a first predefined condition, and in optional block 606, may configure a subset of the feed conveyors in the first set to operate in the second merge mode (e.g., zippering merge mode) in response to identifying the first predefined condition. The subset may be any number or all of the conveyors within the first set of the plurality of feed conveyors in the material handling system. In optional block 508, the processor of the computing device may monitor to identify a second predefined condition, and may configure the subset of the feed conveyors in the first set to operate in the first merge mode (e.g., the slug-building merge mode) in response to identifying the second predefined condition in optional block 608.

Figure 7:
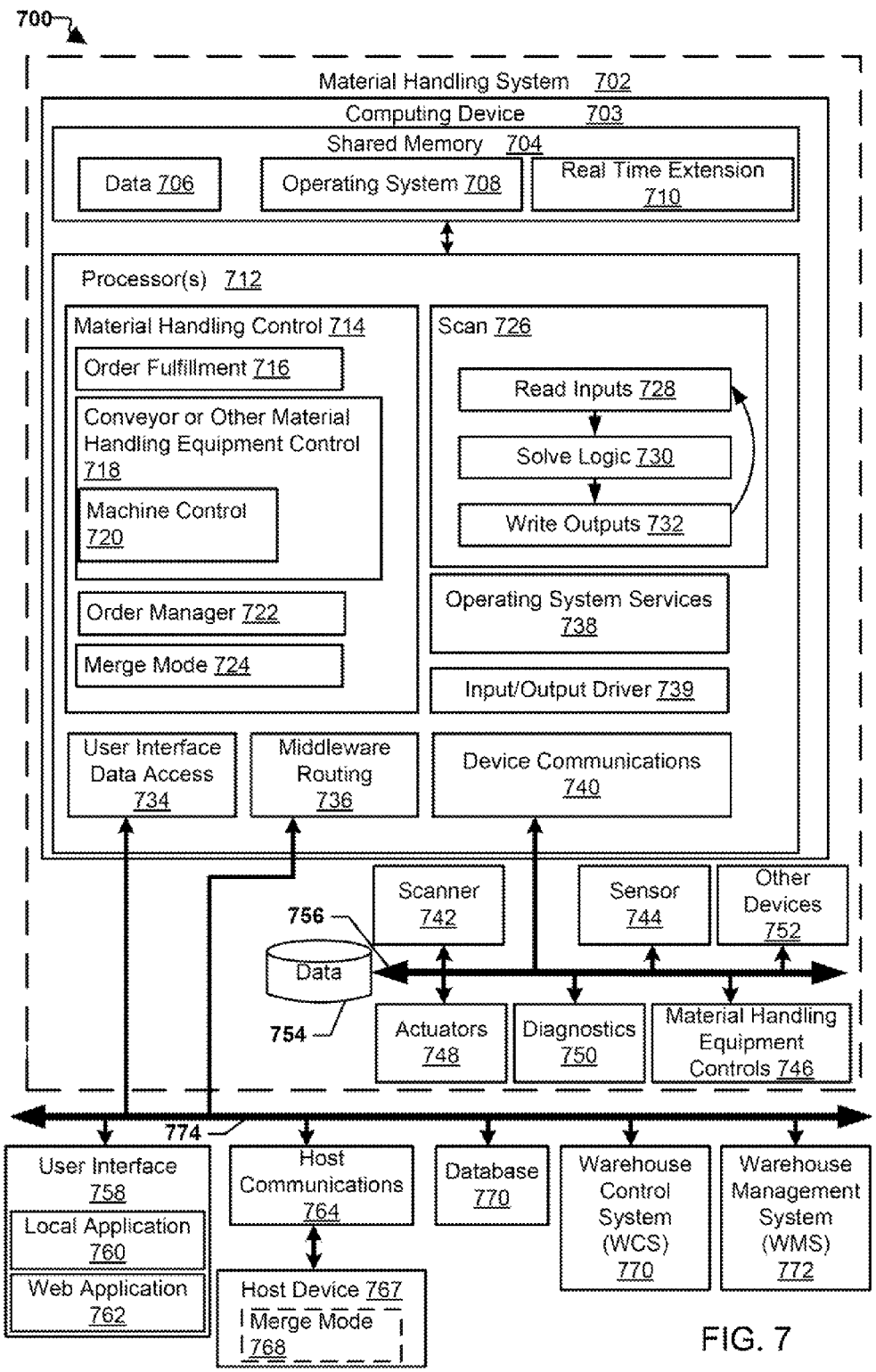
FIG. 7 illustrates an exemplary processing architecture of a material handling system suitable for use with the various embodiments.

FIG. 7 illustrates an exemplary processing architecture 700 of a material handling system 702 suitable for use with the various embodiments. The processing architecture 700 may be implemented in hardware, software, or combinations of hardware and software in one computing device or across a series of computing devices in communication with each other as needed to perform the functionality described herein.

The material handling system 702 may include a computing device 703 including a processor readable shared memory 704 connected to one or more processors 712. The one or more processors may function as controllers for the material handling system 702. For example, one processor may be a primary controller while another may serve as a backup controller that may be swapped for the primary controller automatically or by maintenance personnel in the event of a failure without undue service downtime. The shared memory 704 may include an operating system (e.g., Windows, Linux, etc.) and real time extension 710.

The one or more processors 712 may execute various logical layers, applications, or modules including a material handling controls 714, scans 726, user interface data access 734, middleware routing 736, device communications 740, operating system services 738, and input/output drivers 739. The various logical layers, applications, or modules including material handling controls 714, scans 726, user interface data access 734, middleware routing 736, device communications 740, operating system services 738, and/or input/output drivers 739 may be executed in conjunction with one another and exchange data with one another. As the one or more processors receive inputs (e.g., signals from switches, photo eyes, etc., data messages, or other various input types) the various logical layers, applications, or modules including material handling controls 714, scans 726, user interface data access 734, middleware routing 736, device communications 740, operating system services 738, and/or input/output drivers 739 may be executed individually and/or in concert by the one or more processors 712 to generate outputs (e.g., electrical signals to motor contacts, solenoid valves, switches, lamps, etc., data messages, or other output types).

Scans 726 may be repeatedly executed by the one or more processors 712 and may include a read inputs module 728, a solve logic module 520, and a write outputs module 732. By executing the various logical operations of the modules 728, 730, and 732 on a regular period basis the scans 726 may be counted to measure time. The solve logic module 730 may incorporate any type of logic, including "if-then-else" branching logic, motion control logic, simple logic, sophisticated logic, hard lined logic, configured logic, etc. Data used by the solve logic module 730 may reside in the shared memory 704, such as data 706, or a local, remote, or cloud-based data storage device, such as data store 754. Scans 726 may be performed at different intervals, for example scans for motion control may occur every 1 millisecond to 2 milliseconds, scans for merge subsystems may occur every 5 milliseconds, and general conveyor scans may occur every 25 milliseconds.

Material handling controls 714 may include order fulfillment module 716, conveyor or other material handling equipment control module 718 including a machine control module 720 to generate instructions for conveyors and/or other material handling equipment, order manager module 722, and merge mode application or module 724 to monitor conditions and adjust merge modes for conveyors within a material handling system (e.g., a distribution center).

The one or more processor 712 may exchange data with scanners 742, sensors 744, actuators 748, diagnostic systems 750, material handling equipment controls 746 (such as conveyor controls), data store 754, and other devices 752 (e.g., scales, printers, etc.) via network connections 756 (e.g., TCP/IP connections, Ethernet connections, Ethercat connections, PROFIBUS connections, RS 232 connections, USB connections, Wi-Fi connections, cellular connections, etc.).

The processing architecture 700 may include other systems interfacing with the material handling system 702 via network connections 774 (e.g., TCP/IP connections, Ethernet connections, Ethercat connections, PROFIBUS connections, RS 232 connections, USB connections, Wi-Fi connections, cellular connections, etc.), such as user interface devices 758 (e.g., a display, user terminal, etc.) displaying a local application 760 or web application 762, host communication devices 764 enabling communication with a host device 767 (e.g., via FTP, TCP/IP, etc.), a database 770, a warehouse control system (WCS) 770, and/or a warehouse management system (WMS) 772. A host device may also include a merge mode module or application 768 which may transmit information related to the merging operations of containers to the one or more processors 712 of the material handling system 702.

Figure 8:
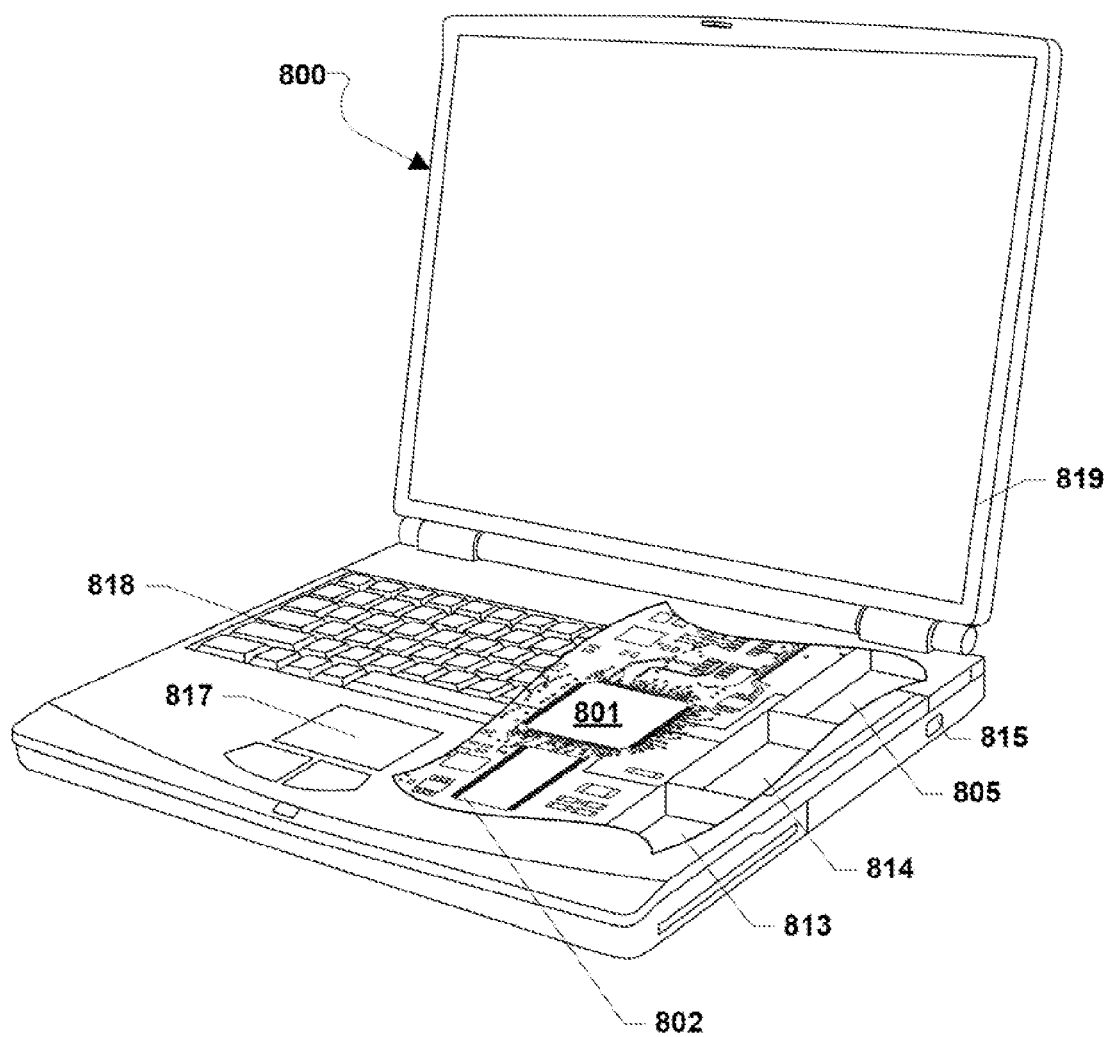
FIG. 8 is a component block diagram of an example laptop computing device suitable for use with the various embodiments.

The various embodiments may be implemented in any of a variety of computing devices, an example of which is illustrated in FIG. 8. A computing device 800 will typically include a processor 801 coupled to volatile memory 802 and a large capacity nonvolatile memory, such as a disk drive 805 of Flash memory. The computing device 800 may also include a floppy disc drive 813 and a compact disc (CD) drive 814 coupled to the processor 801. The computing device 800 may also include a number of connector ports 815 coupled to the processor 801 for establishing data connections or receiving external memory devices, such as a USB or FireWire® connector sockets, or other network connection circuits for establishing network interface connections from the processor 801 to a network or bus, such as a local area network coupled to other computers and servers, the Internet, the public switched telephone network, and/or a cellular data network. The computing device 800 may also include the trackball or touch pad 817, keyboard 818, and display 819 all coupled to the processor 801.

Figure 9:
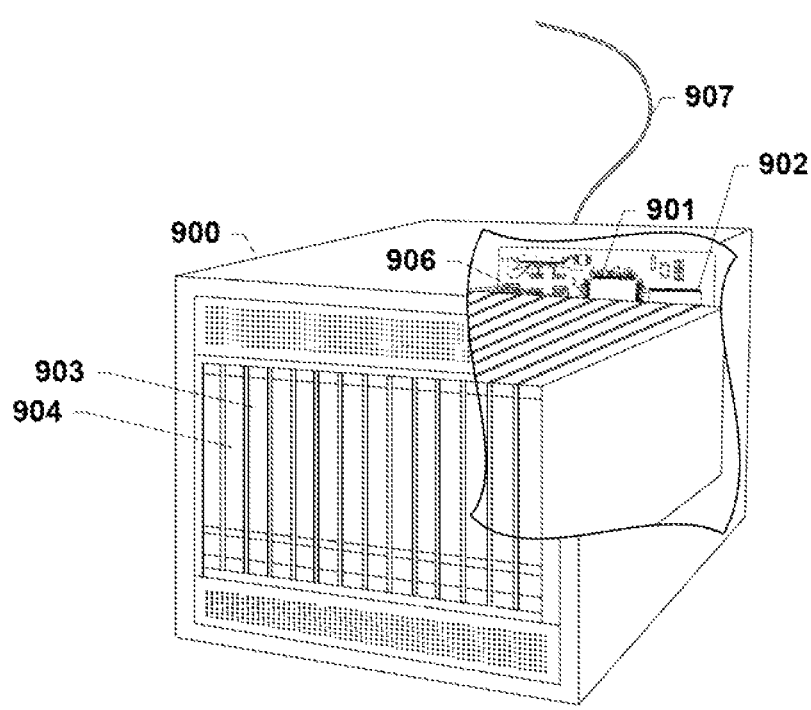
FIG. 9 is a component block diagram of a server computing device suitable for use in an embodiment.

The various embodiments may also be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other computers and servers, the Internet, the public switched telephone network, and/or a cellular data network.

The processors 801 and 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 802, 805, 902, and 903 before they are accessed and loaded into the processors 801 and 901. The processors 801 and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801 and 901 including internal memory or removable memory plugged into the device and memory within the processor 801 and 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for operating a material handling system including a plurality of feed conveyors, comprising:
   configuring, by a computing device, each feed conveyor in the plurality of feed conveyors to operate in a slug-building merge mode;
   monitoring, by the computing device, to identify a first predefined condition;
   configuring, by the computing device, each feed conveyor in the plurality of feed conveyors to operate in a zippering merge mode in response to identifying the first predefined condition;
   monitoring, by the computing device, to identify a second predefined condition; and
   configuring, by the computing device, a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition.

2. The method of claim 1, further comprising:
   configuring, by the computing device, the second set of the feed conveyors in the plurality of feed conveyors to operate in the slug-building merge mode in response to an expiration of a period after the first set of the feed conveyors in the plurality of feed conveyors is configured to operate in the slug-building merge mode.

3. The method of claim 1, wherein configuring, by the computing device, a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition further comprises configuring, by the computing device, the first set of the feed conveyors in the plurality of feed conveyors to build slugs without releasing the slugs.

4. The method of claim 3, wherein the first set of the feed conveyors in the plurality of feed conveyors is configured to release the slugs in response to the second set of the feed conveyors in the plurality of feed conveyors being configured to operate in the slug-building merge mode.

5. The method of claim 1, wherein the first set of the feed conveyors are upstream feed conveyors.

6. The method of claim 5, wherein the second set of the feed conveyors are downstream feed conveyors.

7. The method of claim 1, wherein the first predefined condition is one of whether a number of feed conveyors are currently handling articles, whether the plurality of feed conveyors have handled articles within a predetermined time period, whether a time period has expired, and whether a user input has been received.

8. The method of claim 1, wherein the first set of the feed conveyors and the second set of the feed conveyors comprise all the feed conveyors in the plurality of feed conveyors.

9. A method for operating a material handling system including a plurality of feed conveyors, comprising:
   configuring, by a computing device, a first set of feed conveyors in the plurality of feed conveyors to operate in a slug-building merge mode, wherein the first set of the feed conveyors in the plurality of feed conveyors are capable of operating in either the slug-building merge mode or a zippering merge mode; and
   configuring, by the computing device, a second set of the feed conveyors in the plurality of feed conveyors to operate in the zippering merge mode, wherein the second set of the feed conveyors are dedicated to the zippering merge mode.

10. The method of claim 9, further comprising:
    monitoring, by the computing device, to identify a first predefined condition;
    configuring, by the computing device, a subset of the feed conveyors in the first set to operate in the zippering merge mode in response to identifying the first predefined condition;
    monitoring, by the computing device, to identify a second predefined condition; and
    configuring, by the computing device, the subset of the feed conveyors in the first set to operate in the slug-building merge mode in response to identifying the second predefined condition.

11. A computing device, comprising:
    a processor; and
    a memory,
    wherein the processor is coupled to the memory and configured with processor-executable instructions to perform operations comprising:
      configuring, by the computing device, each feed conveyor in a plurality of feed conveyors to operate in a slug-building merge mode;
      monitoring, by the computing device, to identify a first predefined condition;
      configuring, by the computing device, each feed conveyor in the plurality of feed conveyors to operate in a zippering merge mode in response to identifying the first predefined condition;

monitoring, by the computing device, to identify a second predefined condition; and configuring, by the computing device, a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition.

12. The computing device of claim 11, wherein the processor is configured with processor-executable instructions to perform operations further comprising:

configuring, by the computing device, the second set of the feed conveyors in the plurality of feed conveyors to operate in the slug-building merge mode in response to an expiration of a period after the first set of the feed conveyors in the plurality of feed conveyors is configured to operate in the slug-building merge mode.

13. The computing device of claim 11, wherein the processor is configured with processor-executable instructions to perform operations such that configuring, by the computing device, a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition further comprises configuring, by the computing device, the first set of the feed conveyors in the plurality of feed conveyors to build slugs without releasing the slugs.

14. The computing device of claim 13, wherein the first set of the feed conveyors in the plurality of feed conveyors is configured to release the slugs in response to the second set of the feed conveyors in the plurality of feed conveyors being configured to operate in the slug-building merge mode.

15. The computing device of claim 11, wherein the first set of the feed conveyors are upstream feed conveyors.

16. The computing device of claim 15, wherein the second set of the feed conveyors are downstream feed conveyors.

17. The computing device of claim 11, wherein the first predefined condition is one of whether a number of feed conveyors are currently handling articles, whether the plurality of feed conveyors have handled articles within a predetermined time period, whether a time period has expired, and whether a user input has been received.

18. The computing device of claim 11, wherein the first set of the feed conveyors and the second set of the feed conveyors comprise all the feed conveyors in the plurality of feed conveyors.

19. A computing device, comprising:
a processor; and
a memory,
wherein the processor is coupled to the memory and configured with processor-executable instructions to perform operations comprising:
configuring, by the computing device, a first set of feed conveyors in a plurality of feed conveyors to operate in a slug-building merge mode, wherein the first set of the feed conveyors in the plurality of feed conveyors are capable of operating in either the slug-building merge mode or a zippering merge mode; and
configuring, by the computing device, a second set of the feed conveyors in the plurality of feed conveyors to operate in the zippering merge mode, wherein the second set of the feed conveyors are dedicated to the zippering merge mode.

20. The computing device of claim 19, wherein the processor is configured with processor-executable instructions to perform operations further comprising:

monitoring, by the computing device, to identify a first predefined condition;

configuring, by the computing device, a subset of the feed conveyors in the first set to operate in the zippering merge mode in response to identifying the first predefined condition;

monitoring, by the computing device, to identify a second predefined condition; and configuring, by the computing device, the subset of the feed conveyors in the first set to operate in the slug-building merge mode in response to identifying the second predefined condition.

21. A non-transitory processor-readable storage medium having stored thereon processor-executable instructions configured to cause a processor of a computing device to perform operations comprising:

configuring, by the computing device, each feed conveyor in a plurality of feed conveyors to operate in a slug-building merge mode;

monitoring, by the computing device, to identify a first predefined condition;

configuring, by the computing device, each feed conveyor in the plurality of feed conveyors to operate in a zippering merge mode in response to identifying the first predefined condition;

monitoring, by the computing device, to identify a second predefined condition; and configuring, by the computing device, a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition.

22. The non-transitory processor-readable storage medium of claim 21, wherein the stored processor-executable instructions are configured to cause the processor to perform operations further comprising:

configuring, by the computing device, the second set of the feed conveyors in the plurality of feed conveyors to operate in the slug-building merge mode in response to an expiration of a period after the first set of the feed conveyors in the plurality of feed conveyors is configured to operate in the slug-building merge mode.

23. The non-transitory processor-readable storage medium of claim 21, wherein the stored processor-executable instructions are configured to cause the processor to perform operations such that configuring, by the computing device, a first set of the feed conveyors in the plurality of feed conveyors to operate in the slug-building merge mode and a second set of the feed conveyors in the plurality of feed conveyors to simultaneously operate in the zippering merge mode in response to identifying the second predefined condition further comprises configuring, by the computing device, the first set of the feed conveyors in the plurality of feed conveyors to build slugs without releasing the slugs.

24. The non-transitory processor-readable storage medium of claim 23, wherein the first set of the feed conveyors in the plurality of feed conveyors is configured to release the slugs in response to the second set of the feed conveyors in the plurality of feed conveyors being configured to operate in the slug-building merge mode.

25. The non-transitory processor-readable storage medium of claim 21, wherein the first set of the feed conveyors are upstream feed conveyors.

26. The non-transitory processor-readable storage medium of claim 25, wherein the second set of the feed conveyors are downstream feed conveyors.

27. The non-transitory processor-readable storage medium of claim 21, wherein the first predefined condition is one of whether a number of feed conveyors are currently handling articles, whether the plurality of feed conveyors have handled articles within a predetermined time period, whether a time period has expired, and whether a user input has been received.

28. The non-transitory processor-readable storage medium of claim 21, wherein the first set of the feed conveyors and the second set of the feed conveyors comprise all the feed conveyors in the plurality of feed conveyors.

29. A non-transitory processor-readable storage medium having stored thereon processor-executable instructions configured to cause a processor of a computing device to perform operations comprising:
  configuring, by the computing device, a first set of feed conveyors in a plurality of feed conveyors to operate in a slug-building merge mode, wherein the first set of the feed conveyors in the plurality of feed conveyors are capable of operating in either the slug-building merge mode or a zippering merge mode; and
  configuring, by the computing device, a second set of the feed conveyors in the plurality of feed conveyors to operate in the zippering merge mode, wherein the second set of the feed conveyors are dedicated to the zippering merge mode.

30. The non-transitory processor-readable storage medium of claim 29, wherein the stored processor-executable instructions are configured to cause the processor to perform operations further comprising:
  monitoring, by the computing device, to identify a first predefined condition;
  configuring, by the computing device, a subset of the feed conveyors in the first set to operate in the zippering merge mode in response to identifying the first predefined condition;
  monitoring, by the computing device, to identify a second predefined condition; and
  configuring, by the computing device, the subset of the feed conveyors in the first set to operate in the slug-building merge mode in response to identifying the second predefined condition.

31. A system, comprising:
  a computing device;
  a first set of feed conveyors in a plurality of feed conveyors;
  a second set of the feed conveyors in the plurality of feed conveyors; and
  at least one sensor,
  wherein the at least one sensor is configured to transmit input signals to the computing device;
  wherein the first set of the feed conveyors in the plurality of feed conveyors includes a first set of motor devices configured to cause a first timed release of articles from the first set of the feed conveyors in the plurality of feed conveyors and configured to receive output signals from the computing device;
  wherein the second set of the feed conveyors in the plurality of feed conveyors includes a second set of motor devices configured to cause a second timed release of articles from the second set of the feed conveyors in the plurality of feed conveyors and configured to receive the output signals from the computing device; and
  wherein the computing device comprises:
    a processor;
    a memory; and
    a communications component,
    wherein the processor is coupled to the memory and the communications component and is configured with processor-executable instructions to perform operations comprising:
      configuring each of the feed conveyors in the plurality of feed conveyors to operate in a slug-building merge mode;
      transmitting via the communications component a first output signal to the first set of motor devices of the first set of the feed conveyors in the plurality of feed conveyors and to the second set of motor devices of the second set of the feed conveyors in the plurality of feed conveyors based on the configuring of each of the feed conveyors in the plurality of feed conveyors to operate in the slug-building merge mode;
      receiving via the communications component a first input signal from the at least one sensor;
      monitoring to identify a first predefined condition based on the first input signal received from the at least one sensor;
      configuring each of the feed conveyors in the plurality of feed conveyors to operate in a zippering merge mode in response to identifying the first predefined condition;
      transmitting via the communications component a second output signal to the first set of motor devices of the first set of the feed conveyors in the plurality of feed conveyors and to the second set of motor devices of the second set of the feed conveyors in the plurality of feed conveyors based on the configuring of each of the feed conveyors in the plurality of feed conveyors to operate in the zippering merge mode;
      receiving via the communications component a second input signal from the at least one sensor;
      monitoring to identify a second predefined condition based on the second input signal received from the at least one sensor;
      configuring the first set of the feed conveyors in the plurality of feed conveyors to operate in the slug-building merge mode and the second set of the feed conveyors in the plurality of feed conveyors to simultaneously operate in the zippering merge mode in response to identifying the second predefined condition; and
      transmitting via the communications component a third output signal to the first set of motor devices of the first set of the feed conveyors in the plurality of feed conveyors based on the configuring of the first set of the feed conveyors in the plurality of feed conveyors to operate in the slug-building merge mode.

32. A system, comprising:
  a computing device;
  a first set of feed conveyors in a plurality of feed conveyors; and
  a second set of the feed conveyors in the plurality of feed conveyors,
  wherein the first set of the feed conveyors in the plurality of feed conveyors includes a first set of motor devices configured to cause a first timed release of articles from the first set of the feed conveyors in the plurality of feed conveyors and configured to receive output signals from the computing device;

wherein the second set of the feed conveyors in the plurality of feed conveyors includes a second set of motor devices configured to cause a second timed release of articles from the second set of the feed conveyors in the plurality of feed conveyors and configured to receive the output signals from the computing device; and wherein the computing device comprises:
  a processor;
  a memory; and
  a communications component,
    wherein the processor is coupled to the memory and the communications component and is configured with processor-executable instructions to perform operations comprising:
      configuring the first set of the feed conveyors in the plurality of feed conveyors to operate in a slug-building merge mode, wherein the first set of the feed conveyors in the plurality of feed conveyors are capable of operating in either the slug-building merge mode or a zippering merge mode;

transmitting via the communications component a first output signal to the first set of motor devices of the first set of the feed conveyors in the plurality of feed conveyors based on the configuring of the first set of the feed conveyors in the plurality of feed conveyors to operate in the slug-building merge mode;

configuring the second set of the feed conveyors in the plurality of feed conveyors to operate in the zippering merge mode, wherein the second set of the feed conveyors in the plurality of feed conveyors are dedicated to the zippering merge mode; and transmitting via the communications component a second output signal to the second set of motor devices of the second set of the feed conveyors in the plurality of feed conveyors based on the configuring of the second set of the feed conveyors in the plurality of feed conveyors to operate in the zippering merge mode.

\* \* \* \* \*